(12) United States Patent
Yoshida et al.

(10) Patent No.: US 10,620,113 B2
(45) Date of Patent: Apr. 14, 2020

(54) ENVIRONMENTAL TEST APPARATUS

(71) Applicant: ESPEC CORP., Kita-ku, Osaka-shi, Osaka (JP)

(72) Inventors: Norihiro Yoshida, Kobe (JP); Hideo Sawano, Neyagawa (JP); Shuji Tabuchi, Kobe (JP); Yoshinori Sadakata, Sanda (JP)

(73) Assignee: Espec Corp., Osaka (JP)

( * ) Notice: Subject to any disclaimer, the term of this patent is extended or adjusted under 35 U.S.C. 154(b) by 167 days.

(21) Appl. No.: 15/927,298

(22) Filed: Mar. 21, 2018

(65) Prior Publication Data

US 2019/0011352 A1 Jan. 10, 2019

(30) Foreign Application Priority Data

Jul. 6, 2017 (JP) ................................ 2017-132649

(51) Int. Cl.
| G01N 3/32 | (2006.01) |
| G01N 17/00 | (2006.01) |
| G01N 25/58 | (2006.01) |
| G01M 99/00 | (2011.01) |
| G01N 25/00 | (2006.01) |

(52) U.S. Cl.
CPC ........ *G01N 17/002* (2013.01); *G01M 99/002* (2013.01); *G01N 25/00* (2013.01)

(58) Field of Classification Search
CPC ...... G01M 99/00; G01M 99/002; G01N 3/32; G01N 17/00; G01N 17/002; G01N 25/00; G01N 25/56; G01N 25/58
See application file for complete search history.

(56) References Cited

U.S. PATENT DOCUMENTS

| 4,787,752 A | * | 11/1988 | Fraser | F24F 3/044 374/45 |
| 4,854,726 A | * | 8/1989 | Lesley | G01N 17/00 374/45 |
| 8,001,795 B2 | * | 8/2011 | Pfister | F25D 11/02 62/393 |
| 2003/0066639 A1 | * | 4/2003 | Wang | F25D 3/10 165/263 |
| 2014/0107965 A1 | * | 4/2014 | Mishra | G01N 25/20 702/136 |

FOREIGN PATENT DOCUMENTS

| JP | H04373006 A | 12/1992 | |
| JP | 2002-228611 A | 8/2002 | |
| JP | 2007-183126 A | 7/2007 | |
| JP | 2007183126 A | * 7/2007 | ............ G01N 17/00 |
| JP | 2010-133852 A | 6/2010 | |
| JP | 2017-090251 A | 5/2017 | |

* cited by examiner

*Primary Examiner* — Nguyen Q. Ha
(74) *Attorney, Agent, or Firm* — Wood, Phillips, Katz, Clark & Mortimer

(57) ABSTRACT

An object of the invention is to provide an environmental test apparatus which can directly set an environmental change rate and hardly causes input errors. Change amount information associated with a total change amount and change rate information associated with a change amount per unit time can be input. A target locus of change can be set by using a change amount/change rate setting method of setting the target locus of change based on a combination of change amount information and change rate information. When setting the target locus of change by the change amount/change rate setting method, input of time information is inhibited.

16 Claims, 14 Drawing Sheets

ENVIRONMENTAL TEST APPARATUS

TECHNICAL FIELD

The present invention relates to an environmental test apparatus. The present invention is suitable for an environmental test apparatus that performs a test through setting an environment for each step, changing the environment, and applying thermal stress or the like to a test object. The present invention also relates to an environment forming apparatus controller and a computer program that control, for example, an air conditioner for an environment forming apparatus. The present invention also relates to a heat treatment apparatus.

BACKGROUND ART

There is a thermal cycle test as one of environmental tests performed by changing the environment. In a thermal cycle test, for example, thermal stress is applied to products incorporating such as electronic components and electronic devices, and functions and performances are checked.

In the thermal cycle test, for example, a test object is disposed in a test chamber, and the temperature in the test chamber is raised over a certain period of time. The test object is then subjected to a high temperature environment for a certain period of time. Then, the temperature in the test chamber is returned to room temperature. In some cases, a test object is exposed under a low temperature environment, or is repeatedly exposed under a high temperature environment and a low temperature environment.

These series of environmental changes are repeated a predetermined number of times, and thermal stress is applied on the test object.

An environmental test apparatus performing a thermal cycle test is disclosed in, for example, Patent Document 1.

There is also a test in which a test object is exposed under an environment that changes under predetermined conditions to check the functions and performances of the test object.

Heat treatment apparatuses are also known as apparatuses for performing high temperature tests and heat treatment/drying in production lines.

PRIOR ART DOCUMENTS

Patent Document

Patent Document 1: JP 2007-183126 A

DISCLOSURE OF INVENTION

Technical Problem

There is a demand in the market to set the target locus of change for changing the temperature in the test chamber. For example, there is a demand for making the temperature in the test chamber reach from the starting temperature of 20° C. to a high temperature such as 80° C. over 10 minutes. In other words, there is a case in which it is preferable to have a specific temperature change curve to reach a target temperature from a starting temperature.

Therefore, the present applicant has manufactured an environmental test apparatus, by way of trial, which can set the time required to reach a target temperature. The prototype environmental test apparatus includes an input device, and then the user inputs, to the input device, 80° C. as a final reaching temperature and the time (10 minutes) taken to rise. As a result, the temperature in the test chamber reaches from the initial temperature of 20° C. to the target temperature of 80° C. over a period of 10 minutes.

In this case, the environmental test apparatus is used under various test conditions. For example, it is sometimes desired that the temperature in the test chamber is raised from 20° C., which is the starting temperature, to reach 80° C., which is the high temperature environment, at a temperature change rate of 5° C./min.

In such a case, the operator using the environmental test apparatus described above calculates the time required to reach 80° C. from 20° C. by dividing the temperature difference by the temperature rise rate, and inputs the time to the input device. According to the above example, because the temperature difference is "80° C.-20° C.=60° C.", the time required for the temperature rise is "60° C./5° C.=12 (min)". Accordingly, the operator inputs, to the above input device, 80° C. as the final reaching temperature, and the calculated time (12 minutes) taken to rise. As a result, the temperature in the test chamber rises at a temperature rise rate of 5° C./min and reaches from 20° C. to 80° C. after 12 minutes.

The prototype environmental test apparatus allows the operator to substantially set a temperature change rate by calculating the time required for a temperature change and inputting the time.

However, it has been troublesome to calculate the time required for a temperature change based on a temperature change rate, and it has been desired that the operation should be improved.

A first object of the present invention is to develop an environmental test apparatus that can directly set an environmental change rate.

in order to solve the above problem, the present inventors have changed a program of a controller to improve the program to allow direct input of a temperature change rate.

In the environmental test apparatus after the improvement, 80° C. as the final reaching temperature and a desired temperature change rate (for example, 5° C./min) are input to the input device. As a result, the temperature in the test chamber rises from 20° C. at a temperature rise rate of 5° C./min. As a result, the temperature in the test chamber reaches the target temperature of 80° C. after 12 minutes.

In the improved environmental test apparatus, when it is desired to change the current temperature in the test chamber to the target temperature over a predetermined period of time, a set temperature and a required time are input to the input device. On the other hand, when it is preferable to change the current temperature in the test chamber to the target temperature at a predetermined temperature change rate, a set temperature and a temperature change rate are input to the input device.

However, according to this input method, there has been a concern that the operator enters all three items, namely, target temperature, required time, and temperature change rate.

Assuming that the operator desires to make the starting temperature of 20° C. reach the target temperature of 80° C. at a temperature change rate of 5° C./min, if the operator sets the target temperature to 80° C., the required time to 12 minutes, and the temperature change rate to 5° C./min, the environmental test apparatus operates as desired by the operator. That is, the temperature in the test chamber rises at a temperature rise rate of 5° C./min, and reaches the target temperature of 80° C. after 12 minutes.

In contrast, if the operator mistakenly sets the target temperature to 100° C., but notices the mistake and corrects the temperature to 80° C., the operator needs to also correct the temperature change rate or the required time at the same time. Only the operator knows which to input. If no correction is made, the apparatus may fall into an inoperable state. Further, if the controller has a recalculation function or a function of applying an approximate expression, there is a possibility that the temperature in the test chamber change, showing a temperature locus that is unexpected for the operator.

In addition, it has been troublesome to check whether the input made without an error, and furthermore, the operator may sometimes worry that there might be errors and feel psychological stress.

The second object of the present invention is to provide an environmental test apparatus which can directly set an environmental change rate and hardly causes input errors.

That is, it is an object of the present invention to develop an environmental test apparatus that can directly set an environmental change rate.

The present invention also provides an environmental test apparatus which hardly causes input errors.

Furthermore, it is an object of the present invention to provide an environment forming apparatus controller, an environment forming apparatus computer program, and a heat treatment apparatus that can solve the same problems as described above.

Solution to Problem

According to an aspect for solving the above problems, there is provided an environmental test apparatus capable of placing a test object in a desired test environment to perform an environmental test, wherein the environmental test apparatus is capable of changing the test environment during execution of the environmental test, wherein the environmental test apparatus is capable of inputting change rate information associated with a change amount of environmental factor per unit time, and wherein the environmental test apparatus is capable of setting a target locus of change using the change rate information as one item of input information.

As "environmental factors", there are factors that are set by usual environmental test apparatuses, such as temperature and humidity. In addition, the pressure in the test chamber can be adopted as one of "environmental factors".

An external shock given to the test object and a load are also one of "environmental factors". For example, a voltage and current applied to a test object, the amount and frequency of light beam made to irradiate the test object, a magnetic field, and radiation are also one of environmental factors. Furthermore, a gas concentration such as an ozone concentration or carbon dioxide concentration is one of "environmental factors".

"Change rate information associated with the change amount of environmental factor per unit time" is, for example, a specific numerical value such as 5° C./min, the gradient of a graph which represents a temperature change, or the like.

According to the above aspect and the aspects described below, it is preferable that the environmental test apparatus is capable of inputting time information associated with a time required for an environmental change, and the environmental test apparatus inhibits input of the time information when the target locus of change is set by the change rate information as one item of input information.

In the environmental test apparatus according to this aspect, time information associated with the time required for an environmental change can be input. However, when the target locus of change is set by regarding change rate information as one item of input information, input of time information is inhibited. Thus, inconsistency due to the addition of time information is unlikely to occur.

"Time information associated with a time required for an environmental change" is a time required for a change (for example, 12 minutes) or the start time and end time of a change. If the start time is known, only the end time may be input.

According to the above aspect and the aspects described below, it is preferable that the environmental test apparatus is capable of inputting time information associated with a time required for an environmental change, the environmental test apparatus is capable of setting the target locus of change using the time information as one item of input information, and the environmental test apparatus inhibits input of the change rate information when the target locus of change is set by the time information as one item of input information.

In the environmental test apparatus according this aspect, the target locus of change can also be set by time information. In this case, input of change rate information is inhibited. Thus, inconsistency due to the addition of change rate information is unlikely to occur.

According to another aspect for solving the same problems, there is provided an environmental test apparatus, wherein the environmental test apparatus is capable of inputting change amount information associated with a total change amount, time information associated with a time required for an environmental change, and change rate information associated with a change amount of environmental factor per unit time, wherein the environmental test apparatus is capable of setting a target locus of change using a change amount/time setting method of setting the target locus of change based on a combination of the change amount information and the time information or using a change amount/change rate setting method of setting the target locus of change based on a combination of the change amount information and the change rate information, and wherein the environmental test apparatus inhibits input of the time information when the target locus of change is set by the change amount/change rate setting method.

"Change amount information associated with a total change amount" is, for example, an environmental state before a change and a target environmental state, and indicates the starting temperature of 20° C. and the target temperature of 80° C. according to the above example. Because a starting temperature is often known, only a target temperature may be input. Alternatively, the deviation of 60° C. between the two temperatures may be input.

In the environmental test apparatus according to this aspect, the target locus of change can be set based on a combination of change amount information and change rate information. In this case, input of time information is inhibited. Thus, inconsistency due to the addition of time information is unlikely to occur.

In the environmental test apparatus according to this aspect, the target locus of change can also be set based on a combination of change amount information and time information.

An environmental factor to be changed is preferably temperature.

According to the above aspect and the aspects described below, it is preferable that the environmental test apparatus is capable of setting the target locus of change using the change rate information as one item of input information, and a time required for a change is computed and displayed when the target locus of change is set using the change rate information as one item of input information.

According to the above aspect and the aspects described below, it is preferable that the environmental test apparatus is capable of setting the target locus of change using a time required for an environmental change as one item of input information, and a change rate of environmental factor is computed and displayed when the target locus of change is set using the time required for an environmental change as one item of input information.

An aspect associated with a controller is an environment forming apparatus controller that operates an environment forming apparatus including an environment adjusting device, wherein the controller is capable of inputting change rate information associated with a change amount of environmental factor per unit time, wherein the controller sets a target locus of change based on the change rate information, and wherein the controller controls the environment adjusting device in accordance with the target locus.

In this case, the "environment forming apparatus" is a generic term of devices that form test environments such as temperature, humidity, pressure, and light environments, as well as an environmental test apparatus and devices that form temperature environments for ovens and the like.

An aspect associated with a control program is an environment forming apparatus computer program that operates a controller of an environment forming apparatus including an environment adjusting device, wherein the program is capable of inputting change rate information associated with a change amount of environmental factor per unit time, wherein the program sets a target locus of change based on the change rate information, and wherein the program controls the environment adjusting device in accordance with the target locus.

It is preferable that the computer program described above is recorded in a non-transitory recording medium.

An aspect associated with a heat treatment apparatus is a heat treatment apparatus including: a heat treatment chamber configured to place a treatment object therein; and a heating device raising a temperature in the heat treatment chamber to perform heat treatment to the object therein, wherein the heat treatment apparatus is capable of changing the temperature in the heat treatment chamber during execution of heat treatment, wherein the heat treatment apparatus is capable of inputting change rate information associated with a change amount of temperature per unit time, and wherein the heat treatment apparatus is capable of setting a target locus of temperature change in the heat treatment chamber using the change rate information as one item of input information.

Effect of Invention

The environmental test apparatus, the environment forming apparatus controller, and the environment forming apparatus computer program according to the present invention can set the target locus of environmental change by directly inputting an environmental change rate.

The same effect can be expected also for the heat treatment apparatus according to the present invention, and it is possible to set the target locus of temperature change by directly inputting a heating temperature change rate.

The environmental test apparatus according to the present invention also has an effect of hardly causing input errors.

BRIEF DESCRIPTION OF DRAWINGS

FIGS. 2A and 2B are graphs each showing a target locus of environmental change to be set in the environmental test apparatus shown in FIGS. 1A and 1B, wherein FIG. 2A shows a case based on a change amount/change rate setting method, and 2B shows a case based on a change amount/time setting method.

FIGS. 5A and 5B are front views each showing an input screen in step 2 in the case where test conditions are set based on the change amount/change rate setting method, wherein FIG. 5A shows a state immediately after input, and FIG. 5B shows a state after the confirmation of setting.

FIGS. 7A and 7B are front views each showing an input screen in step 4 in the case where test conditions are set based on the change amount/change rate setting method, wherein FIG. 7A shows a state immediately after input, and FIG. 7B shows a state after the confirmation of setting.

FIGS. 9A and 9B are front views each showing an input screen in step 2 in the case where test conditions are set based on the change amount/time setting method, wherein FIG. 9A shows a state immediately after input, and FIG. 9B shows a state after the confirmation of setting.

FIGS. 10A and 10B are front views each showing an input screen in step 4 in the case where test conditions are set based on the change amount/time setting method, wherein FIG. 10A shows a state immediately after input, and FIG. 10B shows a state after the confirmation of setting.

BEST MODE FOR CARRYING OUT THE INVENTION

An embodiment of the present invention will be described below.

Figure 1A:
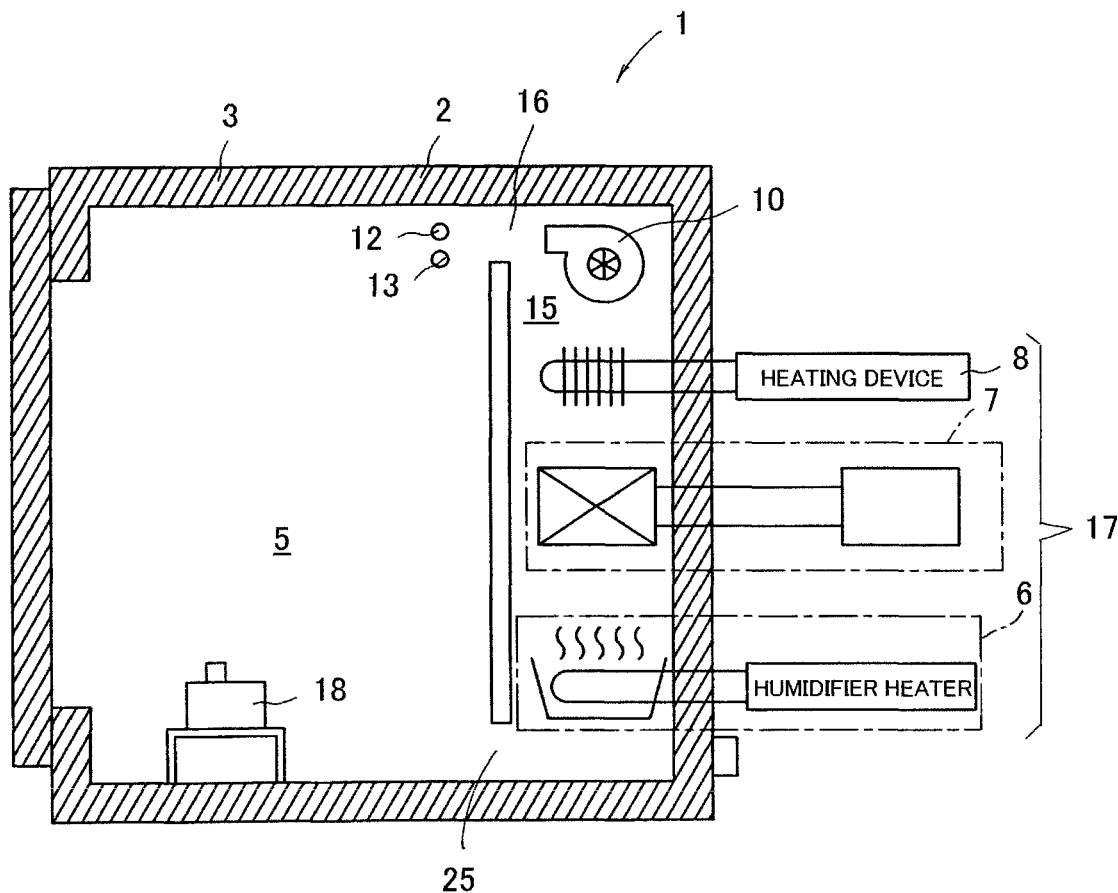
FIG. 1A is a cross-sectional view conceptually showing a mechanical structure of an environmental test apparatus according to this embodiment.
Figure 1B:
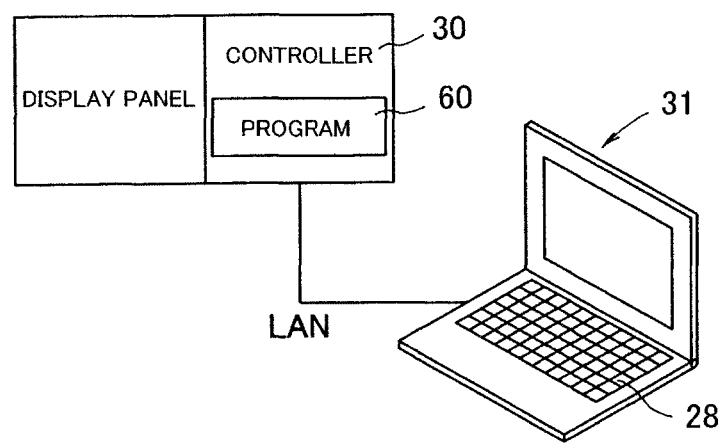
FIG. 1B is a conceptual view of a controller and an input device of the environmental test apparatus.

An environmental test apparatus 1 according to this embodiment has a basic configuration as shown in FIGS. 1A and 1B, and includes a heat insulating chamber 3 covered with a heat insulating wall 2. A test chamber 5 is formed in part of the heat insulating chamber 3. The test chamber 5 is a space in which a test object 18 is disposed.

The environmental test apparatus 1 further includes an air conditioner (environment adjusting device) 17 and an air blower 10. The air conditioner 17 is configured by a humidification device 6, a cooling device 7, and a heating device 8.

The environmental test apparatus 1 includes an air conditioning ventilation duct 15 annularly communicating with the test chamber 5, and the air conditioning ventilation duct 15 incorporates the air conditioner 17 and the air blower 10.

The air conditioning ventilation duct 15 is formed in part of the heat insulating chamber 3 and communicates with the test chamber 5 at two places, namely, an air outlet portion 16 and an air introduction portion 25.

Accordingly, when the air blower 10 is activated, air in the test chamber 5 is introduced into the air conditioning ventilation duct 15 from the air introduction portion 25. The air conditioning ventilation duct 15 is then ventilated, and air comes into contact with the air conditioner 17 to perform heat exchange and humidity adjustment. The adjusted air is blown out from the air outlet portion 16 into the test chamber 5.

A temperature sensor 12 and a humidity sensor 13 are provided near the air outlet portion 16 of the air conditioning ventilation duct 15.

Signals from the temperature sensor 12 and the humidity sensor 13 are input to a controller (environment forming apparatus controller) 30. Then, the controller 30 compares the respective detection values obtained by the temperature sensor 12 and the humidity sensor 13 with set values.

When using the environmental test apparatus 1, the operator operates the air blower 10 to ventilate the inside of the air conditioning ventilation duct 15 and controls the air conditioner 17 so as to bring the detected values obtained by the temperature sensor 12 and the humidity sensor 13 close to the temperature and humidity of a set environment.

That is, by operating the air blower 10, air in the test chamber 5 is introduced into the air conditioning ventilation duct 15 from the air introduction portion 25, and passes through the air conditioner 17 in the air conditioning ventilation duct 15, thereby adjusting the temperature and the humidity. The air whose temperature and humidity are adjusted is returned from the air outlet portion 16 to the test chamber 5, and an environment of a desired temperature and humidity is formed in the test chamber 5.

The environmental test apparatus 1 according to this embodiment artificially forms an environment in which the temperature changes in the test chamber 5, applies stress on the test object 18 by an environmental factor such as heat under the environment to observe change in the test object.

The environmental test apparatus 1 according to this embodiment allows the operator to set the target locus of change when changing the temperature in the test chamber 5. That is, the environmental test apparatus 1 according to this embodiment allows the operator to set the target locus of change in temperature in the test chamber 5 as a test condition.

Test conditions are input to the controller (environment forming apparatus controller) 30. The controller 30 also stores an environment forming apparatus computer program 60 for controlling the air conditioner 17 to change the environment in the test chamber 5 so as to show a set temperature profile.

The environment forming apparatus computer program 60 is recorded on a non-transitory recording medium such as a hard disk in the controller 30.

The environment forming apparatus computer program 60 is sometimes stored in a known non-transitory recording medium such as a CD-ROM or USB memory and available on the market.

This configuration will be described below.

In the environmental test apparatus 1 according to this embodiment, a temperature environment in the test chamber 5 can be set, and the set temperature, the raising/lowering conditions, the set time, and the like are changed for each step.

The target locus (profile) of temperature change is not specifically limited, but as an example, a description will be made assuming that the set temperature, the gradient setting of temperature change, and the set time are changed under the conditions shown in Table 1. In the example, humidity setting in the test chamber 5 is not performed.

TABLE 1

| Step | Temperature (° C.) | Gradient | Time |
|---|---|---|---|
| 1 | 20 | OFF | 5 hours |
| 2 | 80 | ON (Change rate) 5° C./min | Determined from gradient |
| 3 | 80 | OFF | 5 hours |
| 4 | 20 | ON (Change rate) 5° C./min | Determined from gradient |
| 5 | 20 | OFF | 5 hours |

Figure 2A:
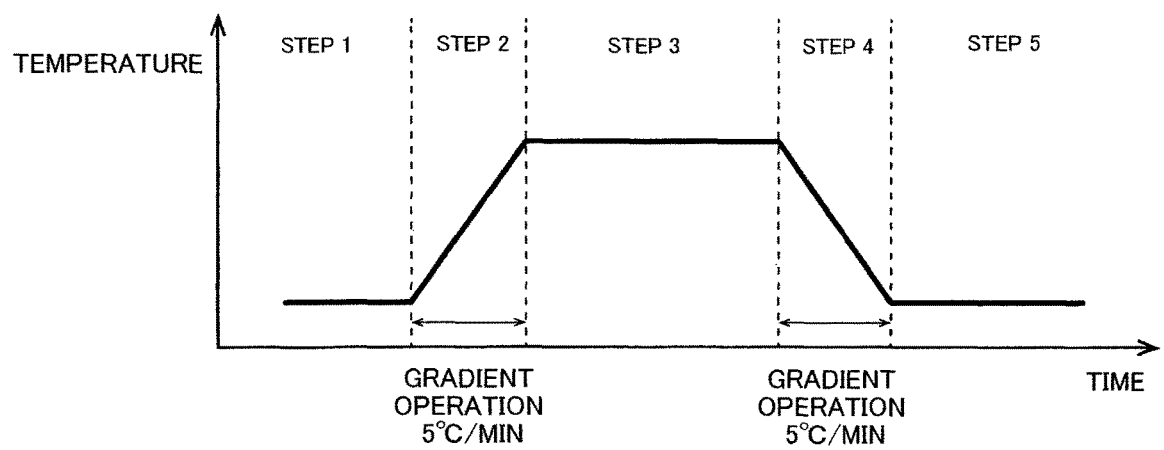

FIG. 2A shows a temperature change curve according to the conditions shown in Table 1.

The set temperature immediately after the start of the test is 20° C., and the set temperature is maintained for 5 hours without being changed (step 1).

When 5 hours have elapsed, the process shifts to step 2 to change the set temperature to 80° C. During the period from the initial temperature of 20° C. to the new target temperature of 80° C., the temperature is raised at a rate of 5° C./min. When raising the temperature at a rate of 5° C./min, the time required for the initial temperature of 20° C. to reach the set temperature of 80° C. is 12 minutes.

When the temperature in the test chamber 5 reaches 80° C., the process shifts to step 3 to maintain the environment for 5 hours while maintaining the set temperature at 80° C.

When 5 hours have elapsed, the process shifts to step 4 to change the set temperature to 20° C. The temperature is lowered at a rate of 5° C./min from the initial temperature (starting temperature) of 80° C. to the set temperature of 20° C., When lowering the temperature at a rate of 5° C./min, the time required for the initial temperature of 80° C. to reach the set temperature of 20° C. is 12 minutes.

Environment setting in the test chamber 5 is performed using a display panel (operation screen) attached to the controller 30 in FIG. 1 or a separate input device 31. The input device 31 is, for example, a personal computer, and is connected to the environmental test apparatus 1 by a known communication means such as a LAN or the Internet. Although the input device 31 is a personal computer as described above and will be described as performing predetermined input using a keyboard 28 or the like, another input method such as a method using a touch panel or voice may be adopted.

Alternatively, setting may be performed on the operation screen (display panel) of the environmental test apparatus 1 itself.

Figure 3:
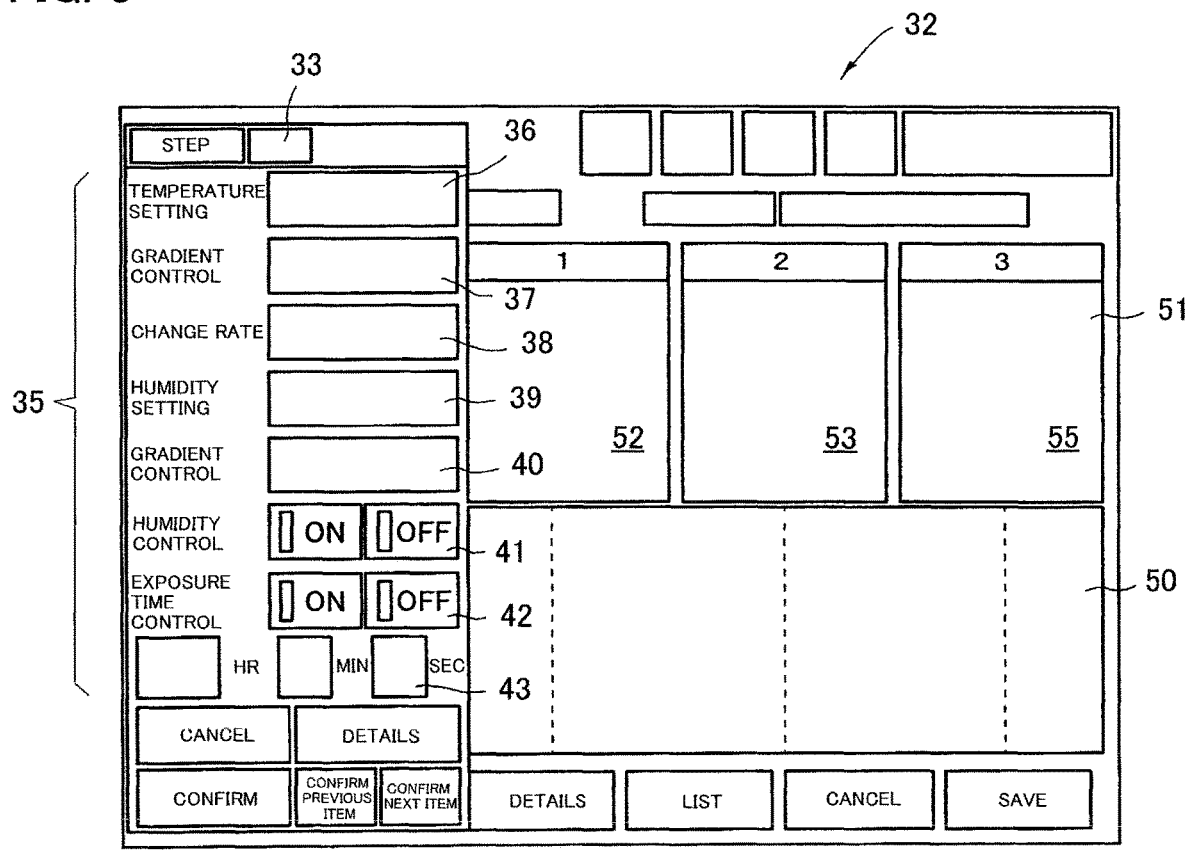
FIG. 3 is a front view of an input screen of the input device of the environmental test apparatus shown in FIGS. 1A and 1B.

By operating the input device 31 or the like, an input screen 32 shown in FIG. 3 is displayed.

The input screen 32 includes a step display section 33 and a setting item display section 35. There are setting sections 36 to 43 corresponding to the setting item display section 35. Furthermore, on the input screen 32, there are a graph display section 50 and a setting display section 51.

The step display section 33 shows currently set steps. The step to be set is changed by a predetermined operation, and the input screen 32 is changed.

The setting item display section 35 is a section in which the item names to be set are displayed. This embodiment include, as setting items, "temperature setting", "gradient control", "change rate", "humidity setting", "gradient control", "humidity control", "exposure time control", "_hr_min_sec".

A temperature setting section 36 corresponding to "temperature setting" is a section for inputting a set temperature in numerals by operating the keyboard 28 or the like.

A temperature gradient selection section 37 corresponding to "gradient control" is a section for setting whether to change the set temperature at a predetermined change rate and further selecting a setting method for the target locus of temperature change.

The environmental test apparatus 1 according to this embodiment allows selection, as a method of setting the target locus of temperature change, a setting method based on the change amount/time setting method and a setting method based on the change amount/change rate setting method.

In this case, the former change amount/time setting method is a method of setting the target locus of change by regarding time information as one of input information. This is a method of setting the target locus of temperature change by combining a target reaching temperature (set temperature) and the time required to reach the target reaching temperature. The latter change amount/change rate setting method is a method of setting the target locus of change by regarding change rate information as one of input information. This is a method of setting the target locus of temperature change by combining a target reaching temperature (set temperature) and change rate information.

A temperature gradient selection section 37 corresponding to "gradient control" is configured to switch between three kinds of indications, namely, "OFF", "ON", and "ON (change rate)" in accordance with an operation on a keyboard 28 or the like.

When adopting the change amount/time setting method, "ON" is displayed in the temperature gradient selection section 37. When adopting the change amount/change rate setting method, "ON (change rate)" is displayed in the temperature gradient selection section 37. "OFF" is displayed when the set temperature is changed but the time required for a temperature change is not designated or when a set temperature is kept at a predetermined temperature without being changed.

A change rate input section 38 corresponding to "change rate" is a section for inputting a change rate such as a temperature change per minute in numerals by operating the keyboard 28 or the like.

The environmental test apparatus 1 according to this embodiment adopts the change mount/change rate setting method as a method of inputting the target locus of temperature change. In this case, the operator can set "change rate" only when "ON (change rate)" is displayed in the temperature gradient selection section 37. When another method is selected, the keyboard 28 or the like becomes invalid and the operator cannot set "change rate".

That is, as described above, if the operator adopts a measure of keeping a set temperature in the temperature gradient selection section 37 corresponding to "gradient control" without any change, or the change amount/time setting method, any input operation by the keyboard 28 or the like with respect to the change rate input section 38 becomes invalid to inhibit any setting operation.

A humidity setting section 39 corresponding to "humidity setting" is a section for inputting a set humidity in numerals by operating the keyboard 28 and the like.

A humidity gradient selection section 40 corresponding to "gradient control" is configured to set whether to change the set humidity at a predetermined change rate, and to further select the setting method.

In this embodiment, humidity setting can be performed only by the change amount/time setting method, and the setting means using the change amount/change rate setting method is not adopted. However, a modification may adopt a setting means using the change amount/change rate setting method.

The humidity gradient selection section 40 corresponding to "gradient control" is configured to switch between two kinds of indications, namely, "OFF" and "ON" in accordance with an operation on a keyboard 28 or the like.

When adopting the change amount/time setting method, "ON" is displayed in the humidity gradient selection section 40. "OFF" is displayed when the set humidity is changed but the time required for a humidity change is not designated or when a set humidity is kept at a predetermined humidity without being changed.

A humidity control switching section 41 corresponding to "humidity control" is a section for selecting whether to perform humidity control. The humidity control switching section 41 can display either "ON" or "OFF", and the operator selects either of them.

A time counting condition selection section 42 corresponding to "exposure time control" can select "ON" or "OFF" by operating the keyboard 28 or the like. However, if gradient control is "ON" or "ON (change rate)", "exposure time control" cannot be set to "ON". When the time counting condition selection section 42 is "ON", time counting in the step is started upon determining that the detected temperature in the test chamber 5 has reached the set temperature. When the time counting condition selection section 42 is "OFF", time counting is started simultaneously with the start of the step.

A time setting section 43 corresponding to "_hr_min_sec" is a section for inputting a set time in numerals by operating the keyboard 28 or the like. The time setting section 43 is a section for setting the time during which the step is executed.

In this embodiment, the time setting section 43 is also a field for setting the time required for the initial temperature to reach the target temperature when the change amount/time setting method is adopted as a method of inputting the target locus of temperature change.

In the environmental test apparatus 1 according to this embodiment, when the change amount/time setting method is adopted and "ON" is selected in the temperature gradient selection section 37, it is possible to set the time required for the change in the time setting section 43.

As described above, the temperature gradient selection section 37 corresponding to "gradient control" allows setting whether to change the set temperature at a predetermined change rate and further allows selecting of a setting method for inputting the target locus. However, if the change amount/change rate setting method is selected, any input operation by the keyboard 28 or the like becomes invalid with respect to the time setting section 43, and time cannot be set in the time setting section 43.

In this embodiment, when the change amount/change rate setting method is selected as a method of inputting a target locus and a change rate is input to the change rate input section 38, the time required to reach the target temperature is automatically calculated and displayed in the time setting section 43. In this case, however, the display of the time setting section 43 cannot be changed even by operating the keyboard 28 or the like.

A graph display section 50 is a section for automatically displaying the locus of environmental change corresponding to set conditions.

The setting display section 51 is a section for displaying the set value in each set step. In this embodiment, there are three fields, namely, display fields 52, 53, and 55, in which settings in three steps are displayed.

A specific input procedure will be described according to the conditions in Table 1.

Figure 4:
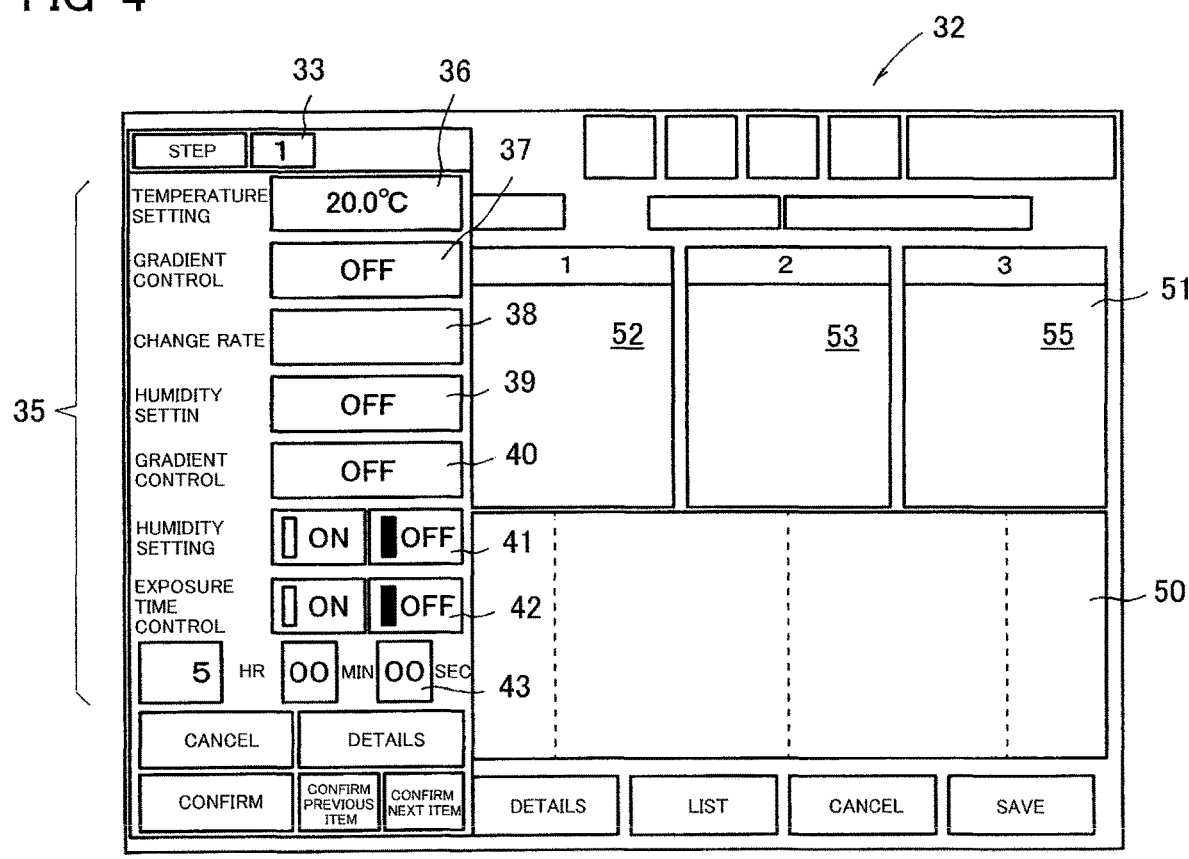
FIG. 4 is a front view of an input screen in step 1 in the case where setting is made based on the change amount/change rate setting method.

First, the screen in step 1 shown in FIG. 4 is displayed. According to the conditions in Table 1, the set temperature immediately after the start of the test is 20° C., and the set temperature is maintained for 5 hours without being changed.

Accordingly, in step 1, as shown in FIG. 4, the numeral "20" is input to the temperature setting section 36 corresponding to "temperature setting".

In step 1, because the set temperature is not changed, "OFF" is selected for the temperature gradient selection section 37 corresponding to "gradient control".

Nothing is input to the change rate input section 38 corresponding to "change rate". Even if the keyboard 28 or the like is operated, the input operation becomes invalid, and no numeral can be input to the change rate input section 38.

In the example, because humidity control is not performed, nothing is inputted to the humidity setting section 39 corresponding to "humidity setting" and the humidity gradient selection section 40 corresponding to "gradient control". Further, "OFF" is selected in the humidity control switching section 41 corresponding to "humidity control". When "OFF" is selected in the humidity control switching section 41, "OFF" is displayed in the field of the humidity setting section 39 corresponding to "humidity setting", as shown in FIG. 4. The same applies to the other steps, and nothing is inputted to the humidity setting section 39 corresponding to "humidity setting" and the humidity gradient selection section 40 corresponding to "gradient control", and "OFF" is selected in the humidity control switching section 41 corresponding to "humidity control".

"OFF" is selected in the time counting condition selection section 42 corresponding to "exposure time control". In the time setting section 43 corresponding to "_hr_min_sec", "5" is input as the time of the step to the "hr" field, and "00" is input to the "min" field and the "sec" field.

When "confirm next item" is selected, the target locus of environmental change corresponding to the set conditions is displayed in the graph display section 50, and the screen is switched to the screen in step 2.

When the screen is changed to step 2, the set values in step 1 already set are displayed in the first display field 52 of the setting display section 51.

According to the conditions in Table 1, the conditions in step 2 are set such that the current temperature is changed to 80° C., and that the temperature is raised at a rate of 5° C./min from the starting temperature of 20° C. to the target temperature of 80° C.

Figure 5A:
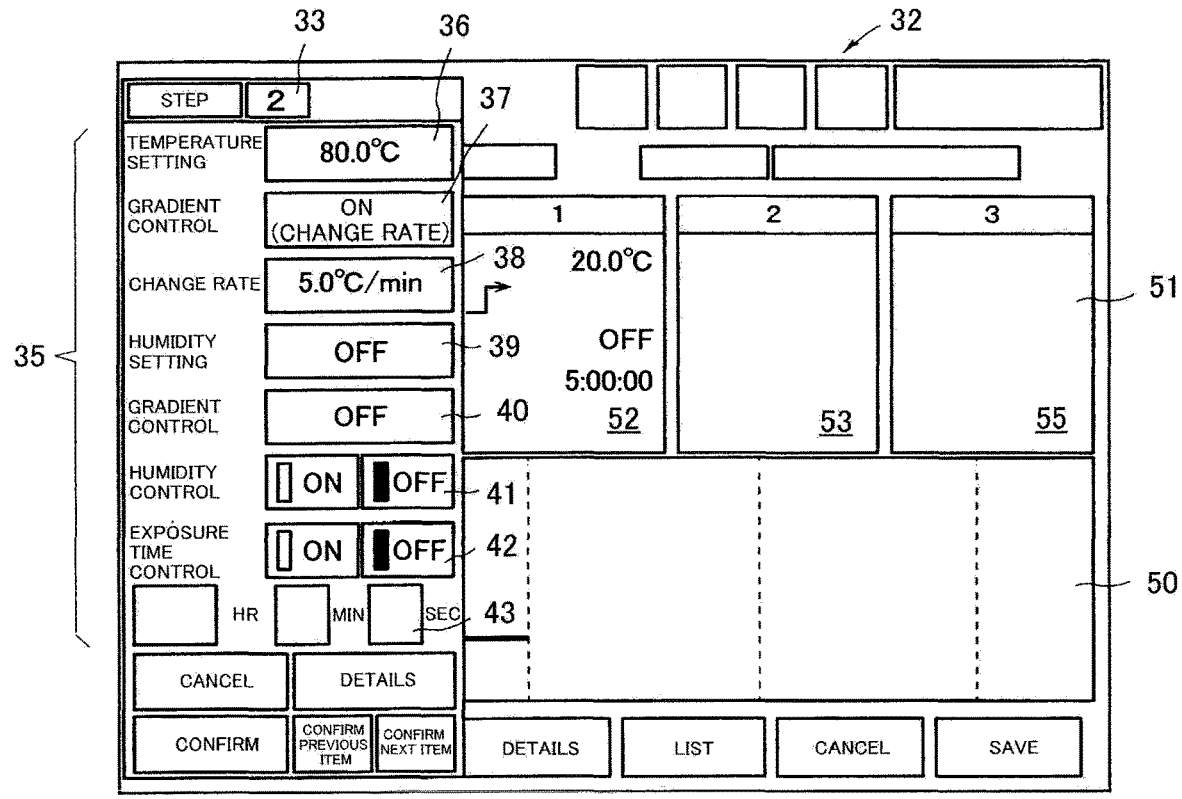

Accordingly, in step 2, as shown in FIG. 5, the numeral "80" is input to the temperature setting section 36 corresponding to "temperature setting".

In step 2, because the temperature approaches the set temperature at a rate of 5° C./min, the change amount/change rate setting method should be adopted as a measure for setting a target locus, and "ON (change rate)" is selected in the temperature gradient selection section 37 corresponding to "gradient control".

When the numeral "5" is input to the change rate input section 38 corresponding to "change rate", "5.0° C./min" is displayed in the change rate input section 38.

Any operation on the keyboard 28 or the like becomes invalid with respect to the time counting condition selection section 42 and the time setting section 43 corresponding to "exposure time control", and hence "ON" or "OFF" cannot be selected. In addition, time cannot be set.

Figure 5B:
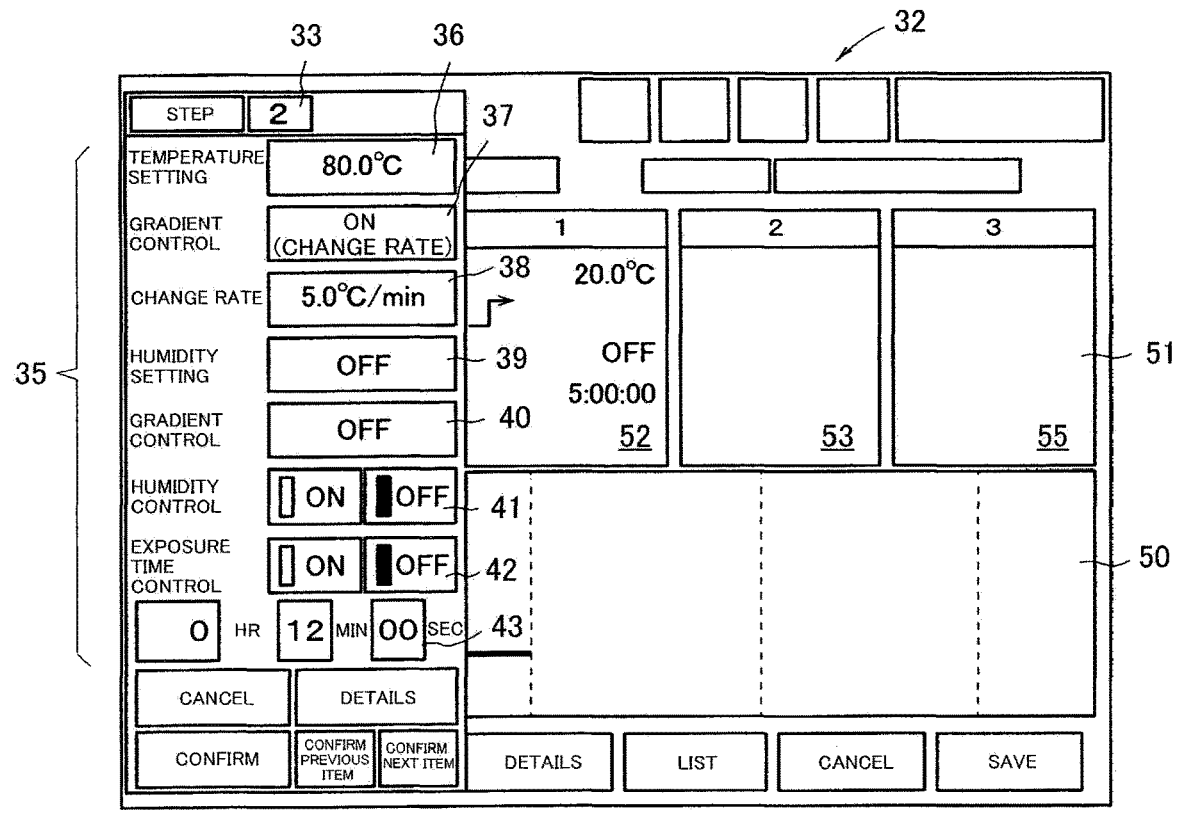

However, when each setting condition is confirmed, the time required to reach the target temperature is automatically calculated and displayed in the time setting section 43, as shown in FIG. 5B. Specifically, "12 min" is displayed.

When "confirm next item" is selected, the target locus of environmental change corresponding to the set conditions is displayed in the graph display section 50, and the target locus of environmental change in step 2 is displayed in the graph display section 50 following step 1. Further, the screen is switched to the screen in step 3.

Figure 6:
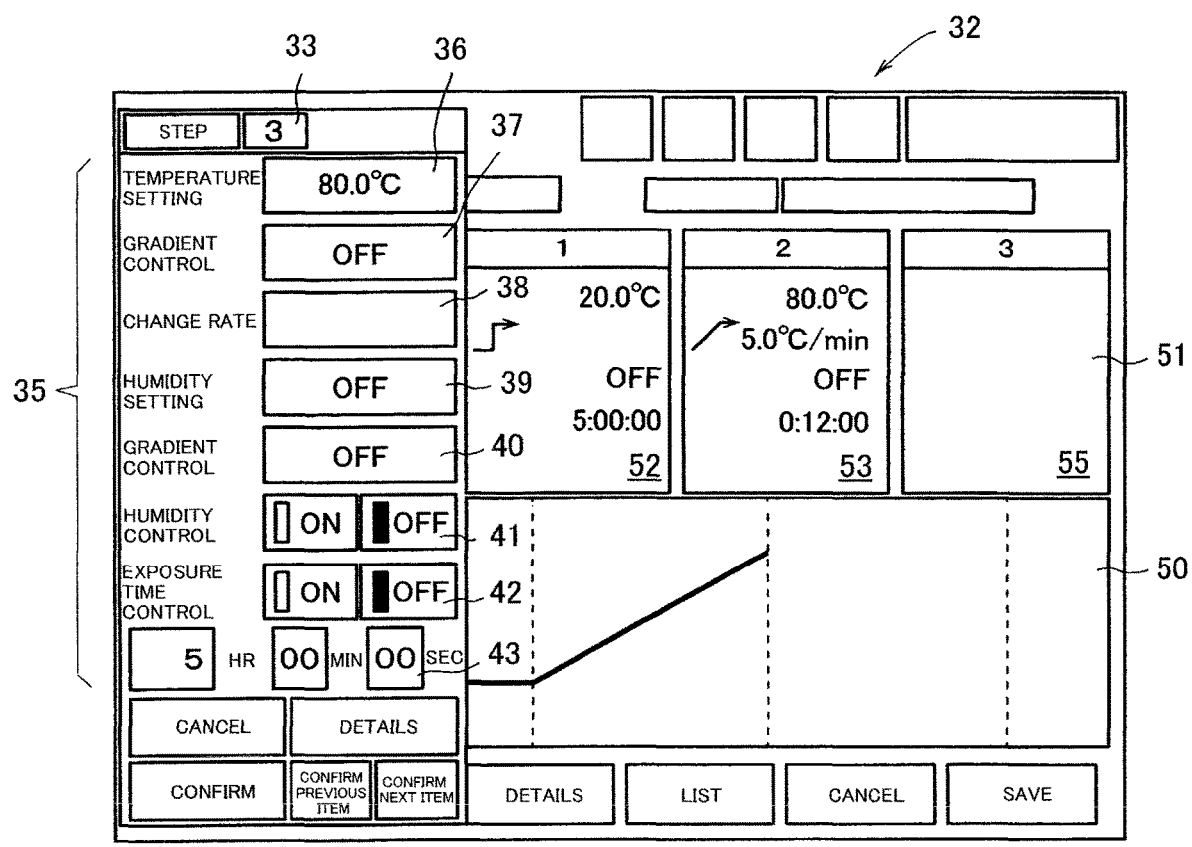
FIG. 6 is a front view of an input screen in step 3 in the case where test conditions are set based on the change as rate setting method.

When the screen is changed to step 3, the set values in step 2 already set are displayed in the second display field 53 of the setting display section 51, as shown in FIG. 6.

According to the conditions in Table 1, the conditions in step 3 are set so as to maintain the set temperature at 80° C. and hold the state for 5 hours.

Accordingly, in step 3, as shown in FIG. 6, the numeral "80" is input to the temperature setting section 36 corresponding to "temperature setting".

In step 3, because the set temperature is not changed, "OFF" is selected for the temperature gradient selection section 37 corresponding to "gradient control".

Nothing is input to the change rate input section 38 corresponding to "change rate". Even if the keyboard 28 or the like is operated, the input operation becomes invalid, and no numeral can be input to the change rate input section 38.

"OFF" is selected in the time counting condition selection section 42 corresponding to "exposure time control". In the time setting section 43, "5" is input as the time of the step to the "hr" field, and "0" is input to the "min" field and the "sec" field.

When "confirm next item" is selected, the screen is changed to step 4.

Figure 7A:
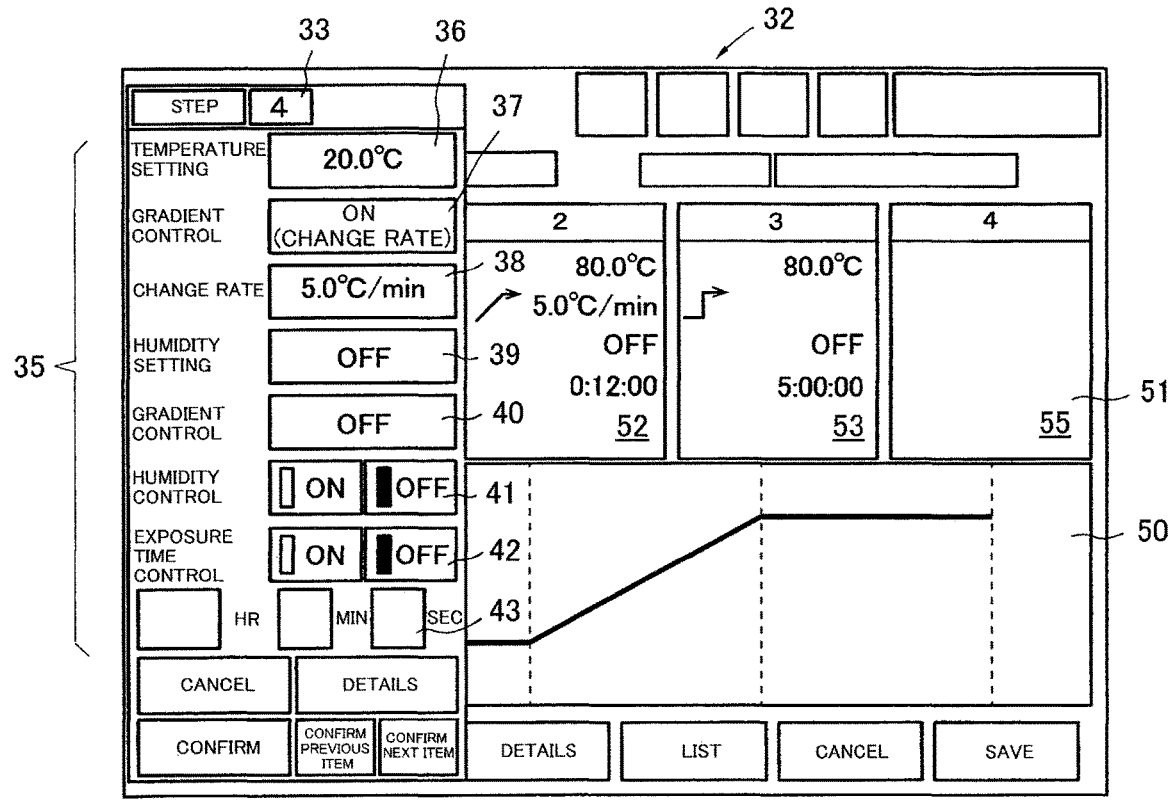

When the screen is changed to step 4, the set values in step 3 already set are displayed in the second display field 53 of the setting display section 51, as shown in FIG. 7A.

In the graph display section 50, the target locus of environmental change in step 3 is displayed following step 2.

According to the conditions in Table 1, the conditions in step 4 are set such that the current temperature is changed to 20° C. and the temperature is lowered at a rate of 5° C./min from the initial temperature of 80° C. to the target temperature of 20° C.

Accordingly, in step 4, as shown in FIG. 7A, the numeral "20" is input to the temperature setting section 36 corresponding to "temperature setting".

In step 4, because the temperature is made to approach the set temperature at a rate of 5° C./min, "ON (change rate)" is selected in the temperature gradient selection section 37 corresponding to "gradient control".

When the numeral "5" is input to the change rate input section 38 corresponding to "change rate", "5.0° C./min" is displayed in the change rate input section 38.

Any operation on the keyboard 28 or the like becomes invalid with respect to the time counting condition selection section 42 corresponding to "exposure time control", and hence "ON" or "OFF" cannot be selected. In addition, time cannot be set in the time setting section 43.

Figure 7B:
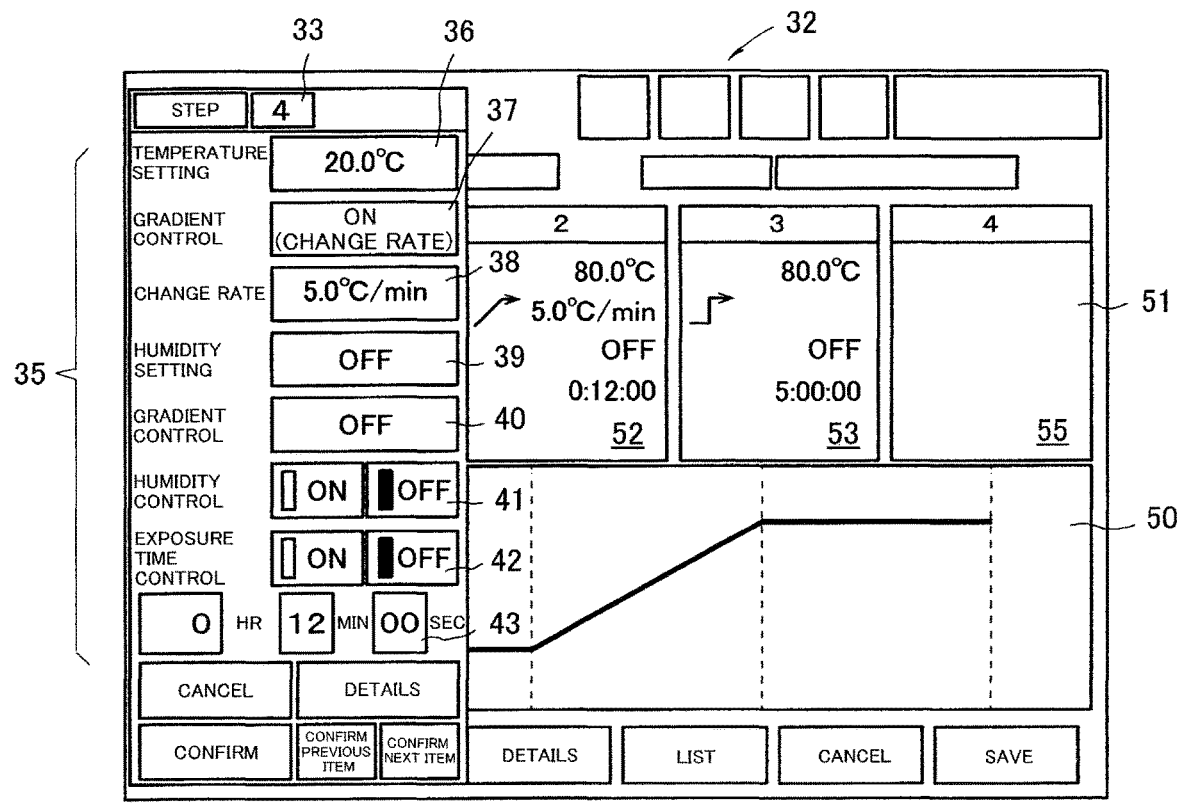

However, when each setting condition is confirmed, the time required to reach the target temperature is automatically calculated and displayed in the time setting section 43, as shown in FIG. 7B. Specifically, "12 min" is displayed.

When "confirm next item" is selected, the target locus of environmental change in step 4 is displayed in the graph display section 50 following step 3.

The screen is then changed to step 5.

When the screen is changed to step 5, the display of the setting display section 51 is shifted, the set values in step 3 are displayed in the first display field 52, and the set values in step 4 are displayed in the second display field 53. The frame for step 5 is displayed in the third display field 55.

According to the conditions in Table 1, the set temperature in step 5 is 20° C., and the set temperature is maintained for 5 hours without being changed.

Figure 8:
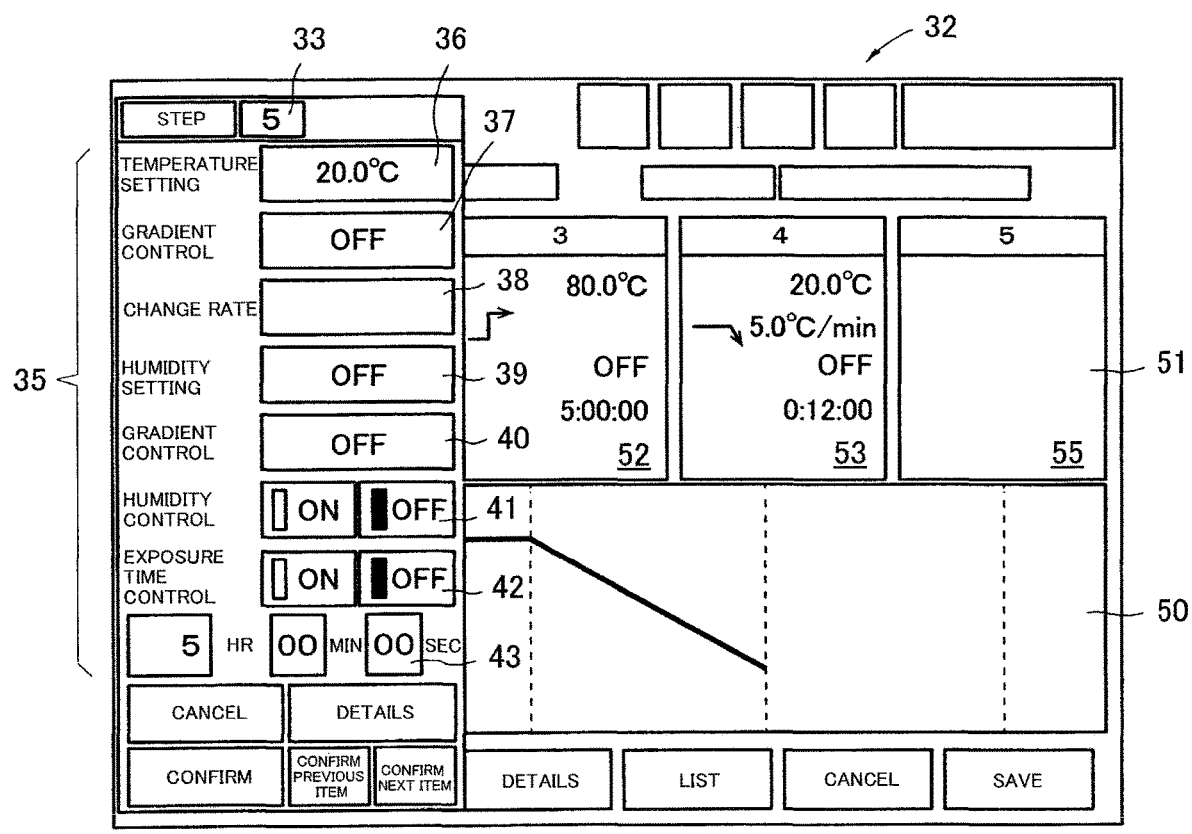
FIG. 8 is a front view of an input screen in step 5 in the case where test conditions are set based on the change amount/change rate setting method.

Accordingly, in step 5, as shown in FIG. 8, the numeral "20" is input to the temperature setting section 36 corresponding to "temperature setting".

"OFF" is selected in the temperature gradient selection section 37 corresponding to "gradient control".

Nothing is input to the change rate input section 38 corresponding to "change rate". Even if the keyboard 28 or the like is operated, the input operation becomes invalid, and no numeral can be input to the change rate input section 38.

"OFF" is selected in the time counting condition selection section 42 corresponding to "exposure time control". In the time setting section 43, "5" is input as the time during which the set temperature is maintained to the "hr" field, and "00" is input to the "min" field and the "sec" field.

When the predetermined start switch is operated after completion of the above setting operation, the environment in the test chamber 5 changes so as to draw a temperature profile based on the conditions shown in Table 1 and the graph of FIG. 2A. That is, the controller 30 as an environment forming apparatus controller controls the air conditioner 17 as an environment adjusting device to change the environment in the test chamber 5 so as to show a temperature profile based on the graph of FIG. 2A.

A case of changing a set temperature, a gradient setting, and a set time will be described next as the change amount/time setting method under the conditions shown in Table 2.

TABLE 2

| Step | Temperature (° C.) | Gradient | Time |
|---|---|---|---|
| 1 | 20 | OFF | 5 hours |
| 2 | 80 | ON (Reaching target over 12 minutes) | 12 min (time taken for change) |
| 3 | 80 | OFF | 5 hours |
| 4 | 20 | ON (Reaching target over 12 minutes) | 12 min (time taken for change) |
| 5 | 20 | OFF | 5 hours |

Figure 2B:
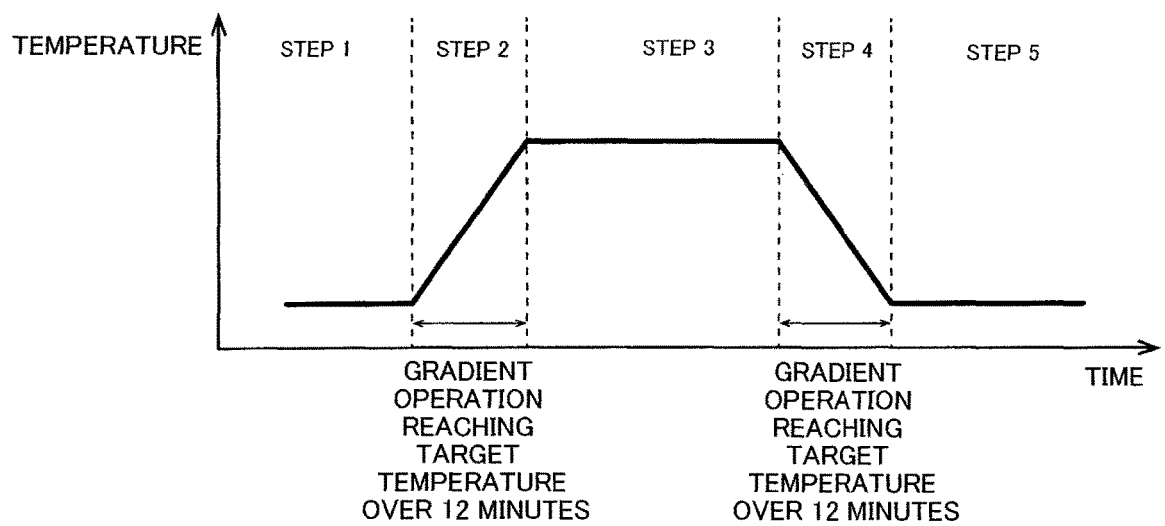

FIG. 2B shows a temperature change curve drawn according to the conditions shown in Table 2.

The differences from the conditions in Table 1 are steps 2 and 4. Under the conditions of Table 2, the temperature in the test chamber 5 is changed over a predetermined time.

Steps 1, 3, and 5 are the same as in the case of Table 1, and hence a description thereof will be omitted.

Under the conditions shown in Table 2, the set temperature in step 2 is changed to 80° C. The initial temperature of 20° C. changes to the target temperature of 80° C. over a period of 12 minutes. The same applies to step 4, That is, the temperature of 80° C. changes to the target temperature of 20° C. over a period of 12 minutes.

Figure 9A:
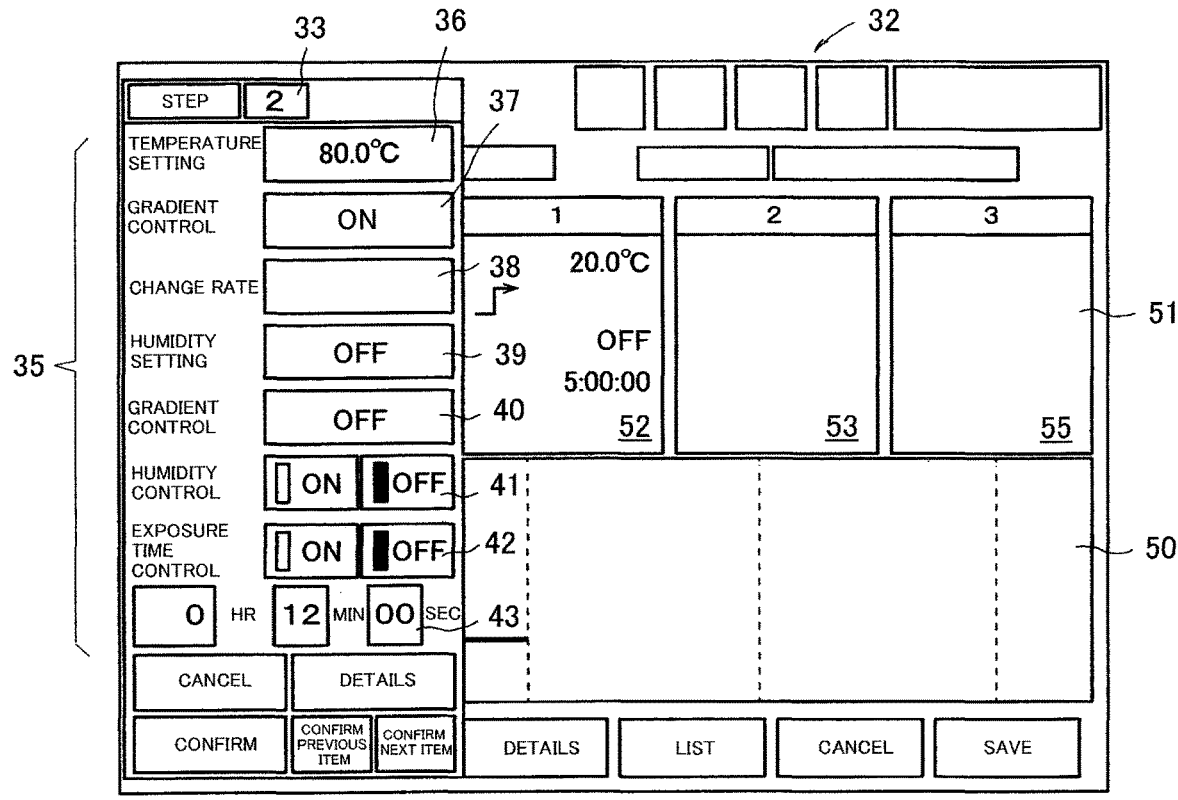

Accordingly, in step 2, as shown in FIG. 9A, the numeral "80" is input to the temperature setting section 36 corresponding to "temperature setting".

In step 2, because the temperature approaches the set temperature over 12 minutes, the change amount/time setting method should be adopted as a measure for setting a target locus, and "ON" is selected in the temperature gradient selection section 37 corresponding to "gradient control".

With regard to the change rate input section 38 corresponding to "change rate", any operation on the keyboard 28 or the becomes invalid, and no numerical value can be input.

"OFF" is selected in the time counting condition selection section 42 corresponding to "exposure time control". The time of 12 minutes is input to the time setting section 43.

Figure 9B:
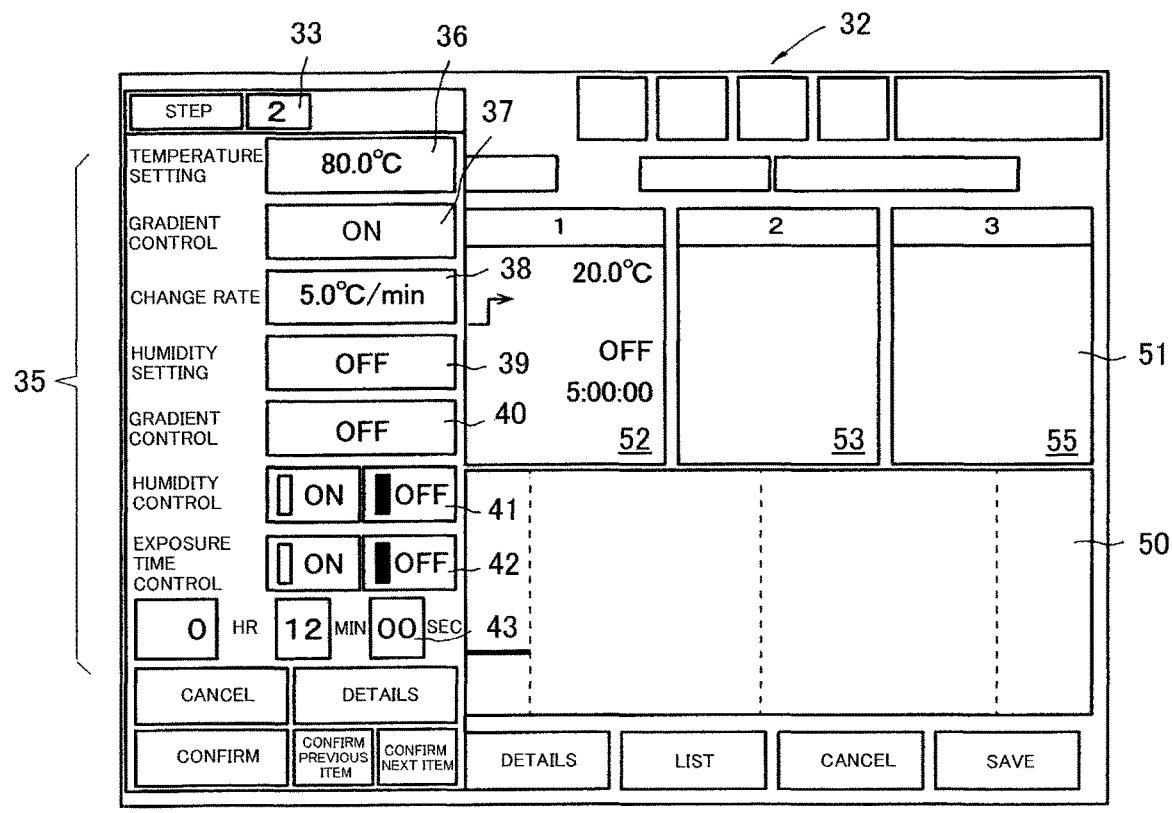

As described above, although no input operation can be performed by the keyboard 28 or the like with respect to the change rate input section 38 corresponding to "change rate", a change rate is automatically calculated upon determination of set conditions, and is automatically displayed in the change rate input section 38, as shown in FIG. 9B. Specifically, "5.0° C./min" is displayed. However, a change rate may not be calculated automatically or may not be displayed.

The input method for step 4 will be described next. According to the conditions in Table 2, the conditions in step 4 are set such that the current temperature is changed to 20° C. and the temperature is lowered over 12 minutes from the initial temperature of 80° C. to the target temperature of 20° C.

Figure 10A:
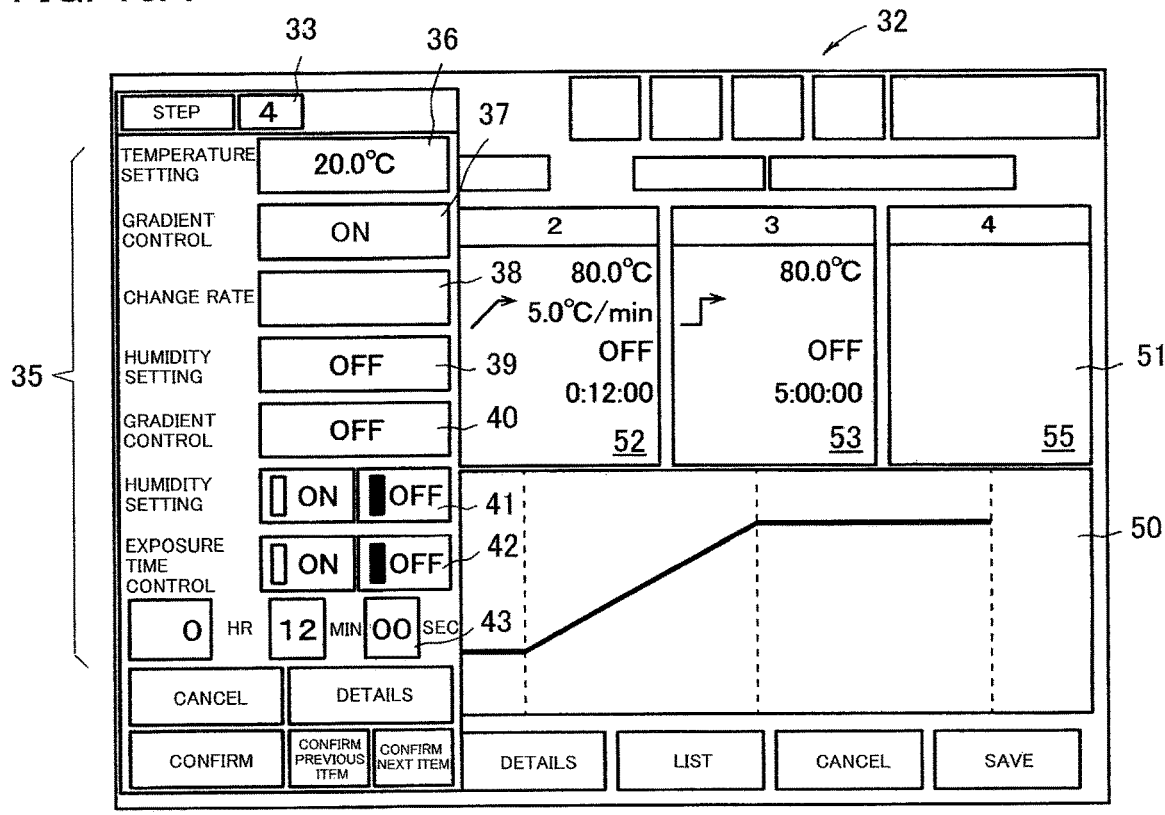

Accordingly, in step 4, as shown in FIG. 10A, the numeral "20" is input to the temperature setting section 36 corresponding to "temperature setting".

In step 4, because the temperature approaches the set temperature over 12 minutes, the change amount/time setting method should be adopted in the temperature gradient selection section 37 corresponding to "gradient control", and "ON" is selected in the temperature gradient selection section 37.

With regard to the change rate input section 38 corresponding to "change rate", any operation on the keyboard 28 or the like becomes invalid, and no numerical value can be input.

"OFF" is selected in the time counting condition selection section 42 corresponding to "exposure time control". The time of 12 minutes is input to the time setting section 43.

Figure 10B:
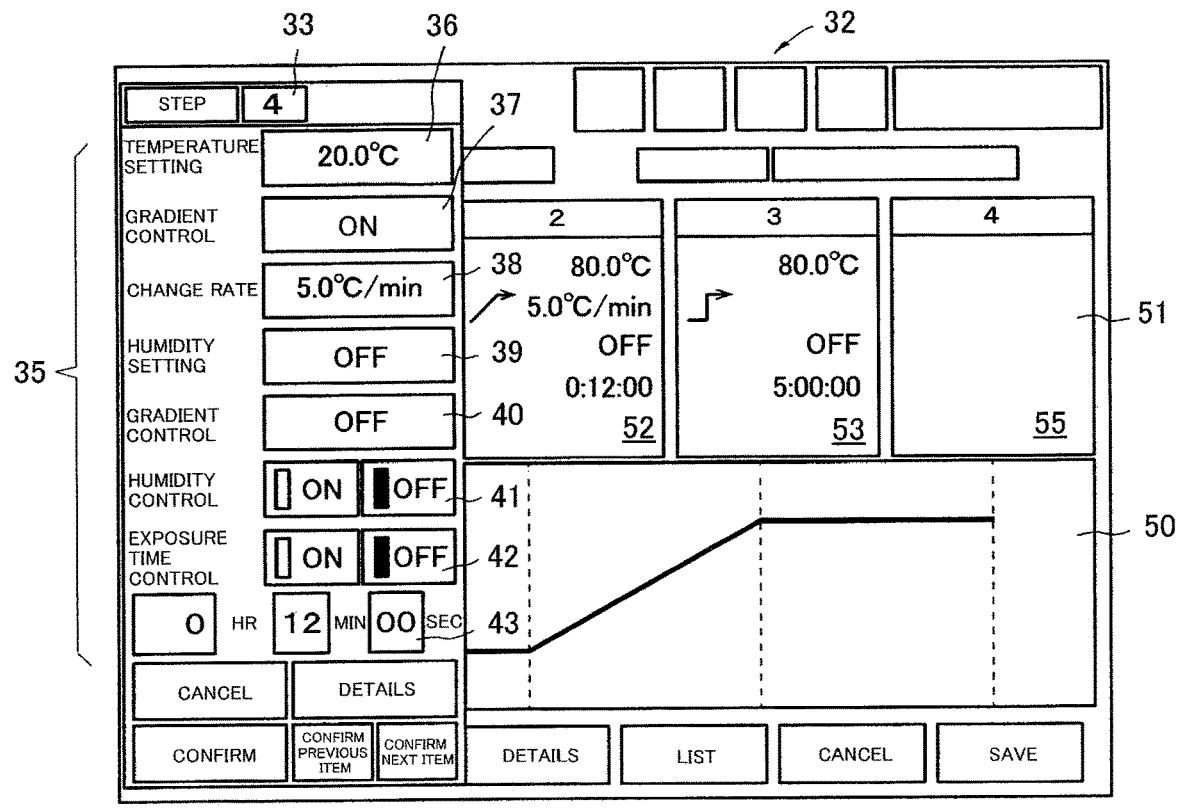

As described above, although no input operation can be performed by the keyboard 28 or the like with respect to the change rate input section 38 corresponding to "change rate", a change rate is automatically calculated upon determination of set conditions, and is automatically displayed in the change rate input section 38, as shown in FIG. 10B. Specifically, "5.0° C./min" is displayed. In addition, a change rate may not be calculated automatically or may not be displayed in the change rate input section 38.

The above embodiment is configured to select, on a setting screen in each step, between the change amount/time setting method of setting the target locus of change based on the combination of change amount information and time information and the change amount/change rate setting method of setting the target locus of change based on the combination of change amount information and change rate information. However, one of the methods may be selected in advance on an initial screen or the like.

Figure 11:
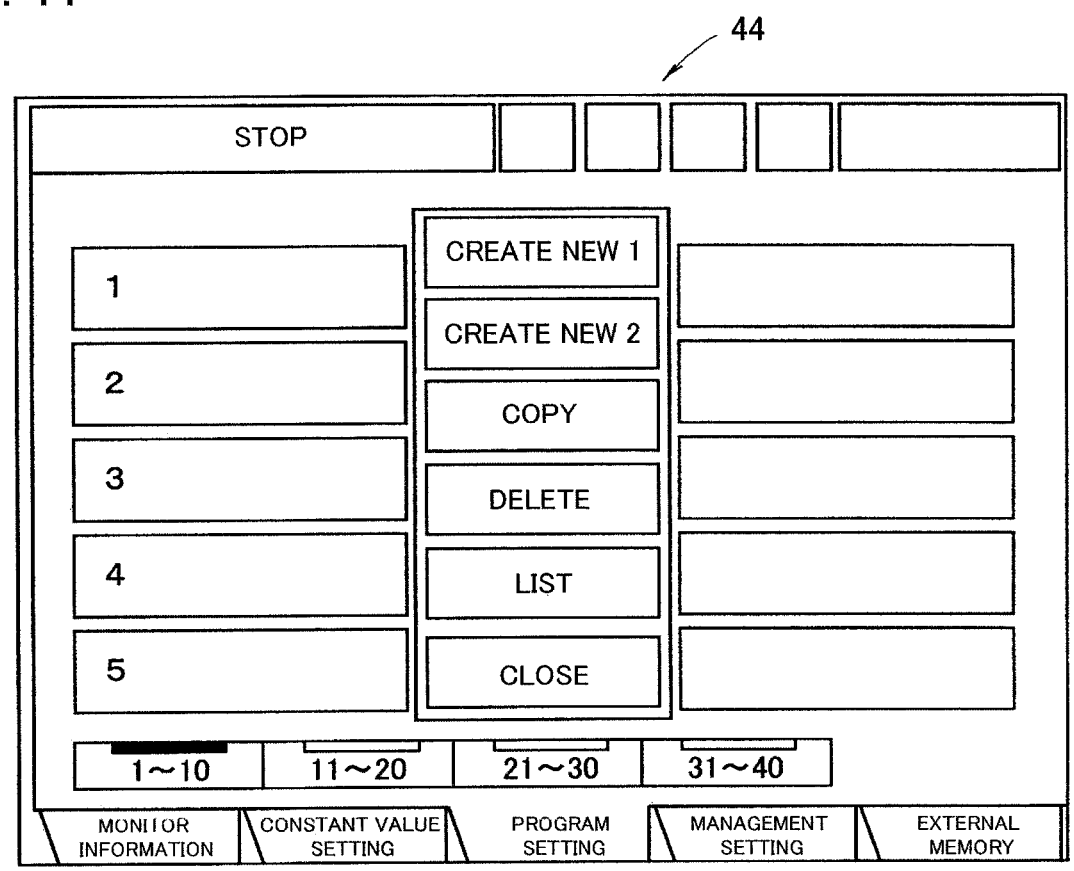
FIG. 11 is a front view of an initial screen of the input device of an environmental test apparatus according to another embodiment of the present invention.

Assume that selection items for "create new 1" and "create new 2" are created on an initial screen 44 shown in FIG. 11. In this case, when one of the items is selected, each step screen may be dedicated to the change amount/time setting method, whereas when the other item is selected, each step screen may be dedicated to the change amount/change rate setting method.

Figure 12:
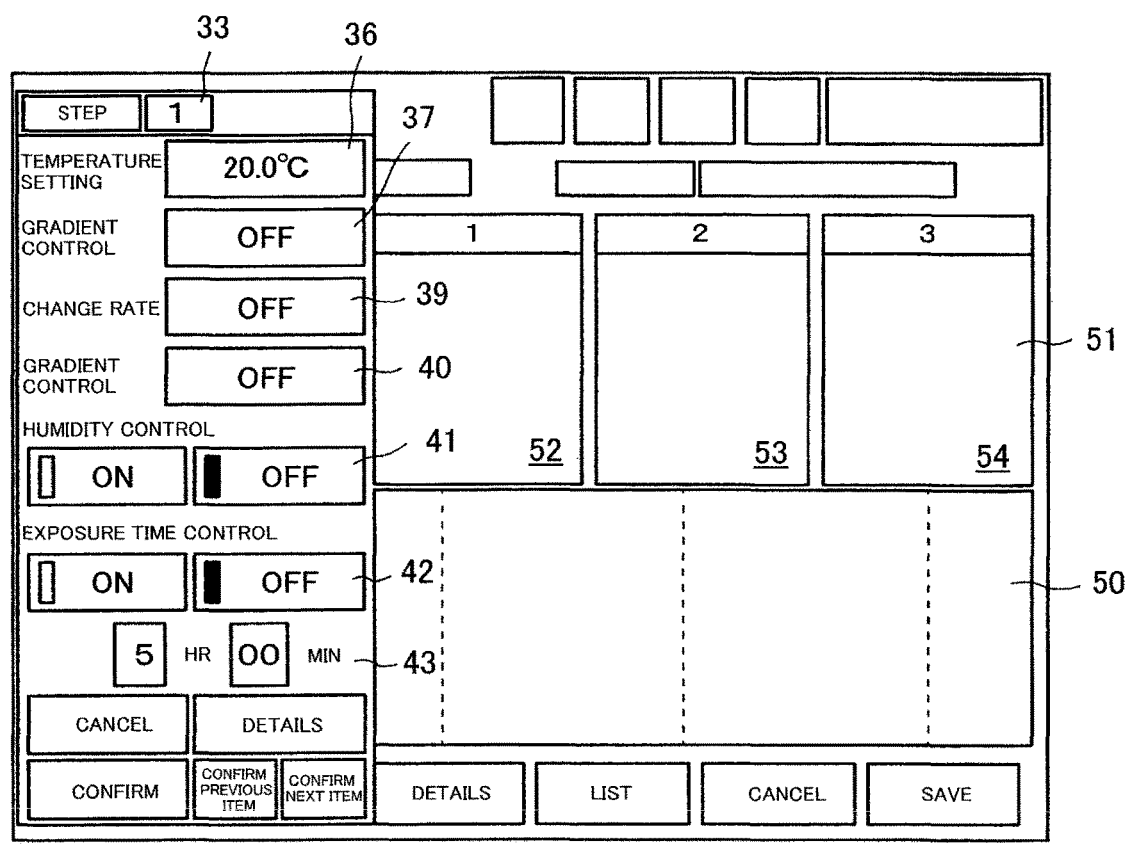
FIG. 12 is a front view of an input screen in the case where setting is made based on the change amount/time setting method in the input device shown in FIG. 11.

FIG. 12 shows an example of an input screen when "create new 1" is selected on the initial screen 44 shown in FIG. 11 to make settings based on the change amount/time setting method. The input screen used to make settings based on the change amount/time setting method includes neither the item name of "change rate" nor the corresponding change rate input section, thus inhibiting input of "change rate".

When "create new 2" is selected, an input screen becomes the screen used to make settings based on the change amount/change rate setting method. The input screen in this case is the same as the input screen 32 in FIG. 3. As another example, the screen used when "create new 2" is selected may have no field of change amount/time setting to inhibit corresponding settings.

According to the above embodiment, when setting the target locus of change by the change amount/time setting method, input of change rate information is inhibited. In addition, when setting the target locus of change by the change amount/change rate setting method, input of time information is inhibited. Therefore, it is possible to prevent inconsistent setting conditions from being set, and to prevent an unexpected setting condition from being set.

According to the above embodiment, it is possible to set the target locus of change based on the change amount/time setting method and also set the target locus of change based on the change amount/change rate setting method. That is, according to the above embodiment, it is possible to set the target locus of change by regarding change rate information associated with the change amount of environmental factor per unit time as one item of input information, and also set the target locus of change by regarding time information associated with the time required for an environmental change as one item of input information.

However, the present invention is not limited to this configuration, and the target locus of change can also be set only by the change amount/change rate setting method.

The input screens and the input procedure shown in FIGS. 3 to 12 each are merely an example, and the present invention is not limited thereto.

For example, even when "ON (change rate)" is selected in the temperature gradient selection section 37, if "0" is input as a change rate in the subsequent change rate input section 38, the input of time information may be allowed. This makes it possible to implement a configuration that can substantially set the target locus of change by the change amount/time setting method and to set conditions without gradient setting as in steps 1, 3, and 5 in FIG. 2 while the setting of "ON (change rate)" is kept without any change.

In the above embodiment, for example, in steps 1 and 3, the temperature in the test chamber 5 is kept at a set temperature for a certain period of time. However, settings may be made such that a predetermined environment is not kept for a certain period of time. For example, it is not necessary to maintain a certain environment for a certain period of time by setting only a set locus in the form of a polygonal line as exemplified by the graph of FIG. 13A.

Figure 13A:
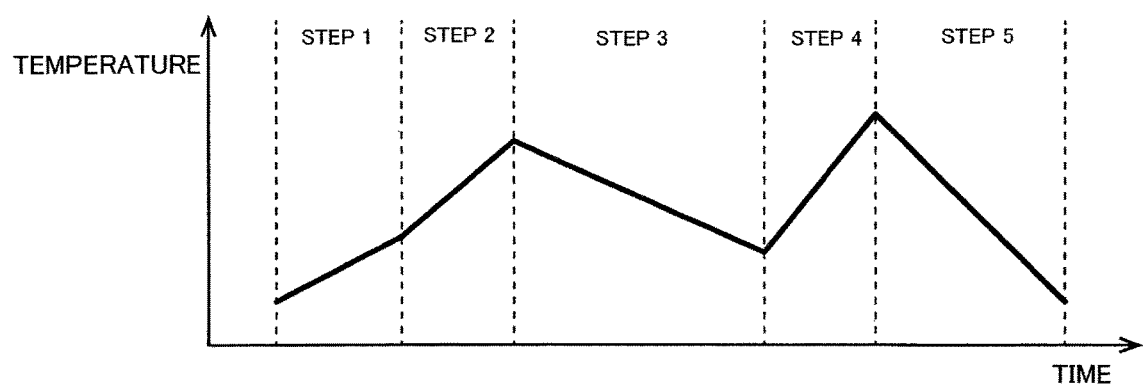
FIGS. 13A and 13B are graphs each showing an example of the target locus of environmental change to be set in the environmental test apparatus.

The graph of FIG. 13A represents the target locus of temperature change when settings are made to raise or lower a temperature while changing a temperature change gradient for each step.

Figure 13B:
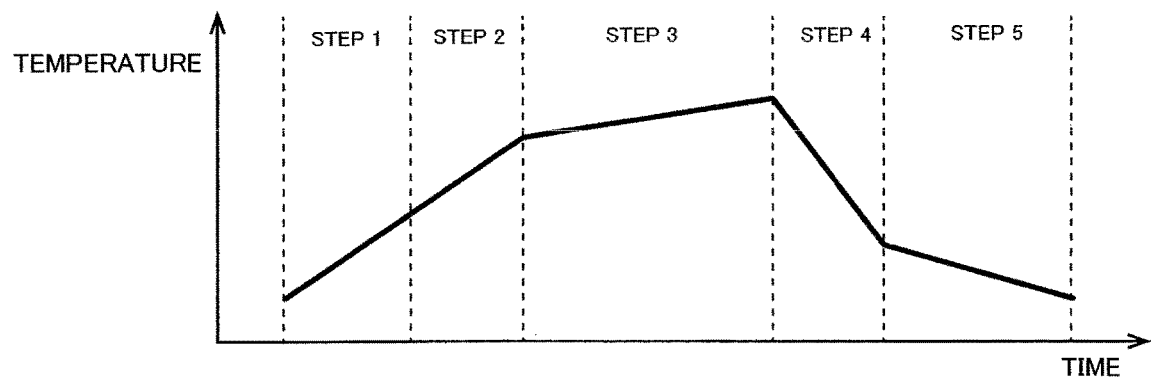

As shown in FIG. 13B, the same change rate may be set in consecutive steps, and the environment may be changed at the same change rate while the consecutive steps are executed.

Needless to say, in one step, the target locus of change may be set by the change amount/time setting method, and in either of the preceding and succeeding steps, the target locus of change may be set by the change amount/change rate setting method. As a result, in consecutive steps, the environment may change at the same change rate.

The environmental test apparatus 1 described above has the air conditioner 17 as an environment adjusting device and can set the target locus of temperature change in the test chamber 5.

The environment adjusting device is not limited to the simple air conditioner 17, and may have another additional environment changing function. Furthermore, the environment adjusting device may not have an air conditioning function and may have another environment changing function.

For example, in addition to the above configuration, the air conditioner 17 as an environment adjusting device may be a device that can set the target locus of change in humidity in the test chamber 5 and can also select, as a method of setting a target locus, both of the change amount/time setting method and the change amount/change rate setting method. When setting the target locus of change in humidity by the change amount/time setting method, input of the change rate of humidity is inhibited. In addition, when setting the target locus of change in humidity by the change amount/change rate setting method, input of time information is inhibited.

The present invention can also be applied to an environmental test apparatus that can set the target locus of change in pressure.

For example, the present invention can also be applied to an environmental test apparatus having a sealed test chamber to maintain predetermined atmospheric pressure in the test chamber. Hereupon the environmental test apparatus can set up the time required for a change from the current pressure to a target pressure, or the change rate.

The environment adjusting device may be a device that applies a voltage or current to the test object 18, irradiates the test object 18 with a light beam or radiation, or forms a magnetic field, and can change the intensity, frequency, and the like of them.

The environment adjusting device may be a device that can introduce a gas such as ozone or carbon dioxide into the test chamber 5 and change its concentration.

The environmental test apparatus described above has the test chamber 5 and adjusts the temperature and humidity in the test chamber 5. However, the present invention can also be applied to an environmental test apparatus that is structured to dispose a test object in a temperature-controlled liquid or an environmental test apparatus that is structured to place a test object on a temperature-controlled hot plate.

Figure 14A:
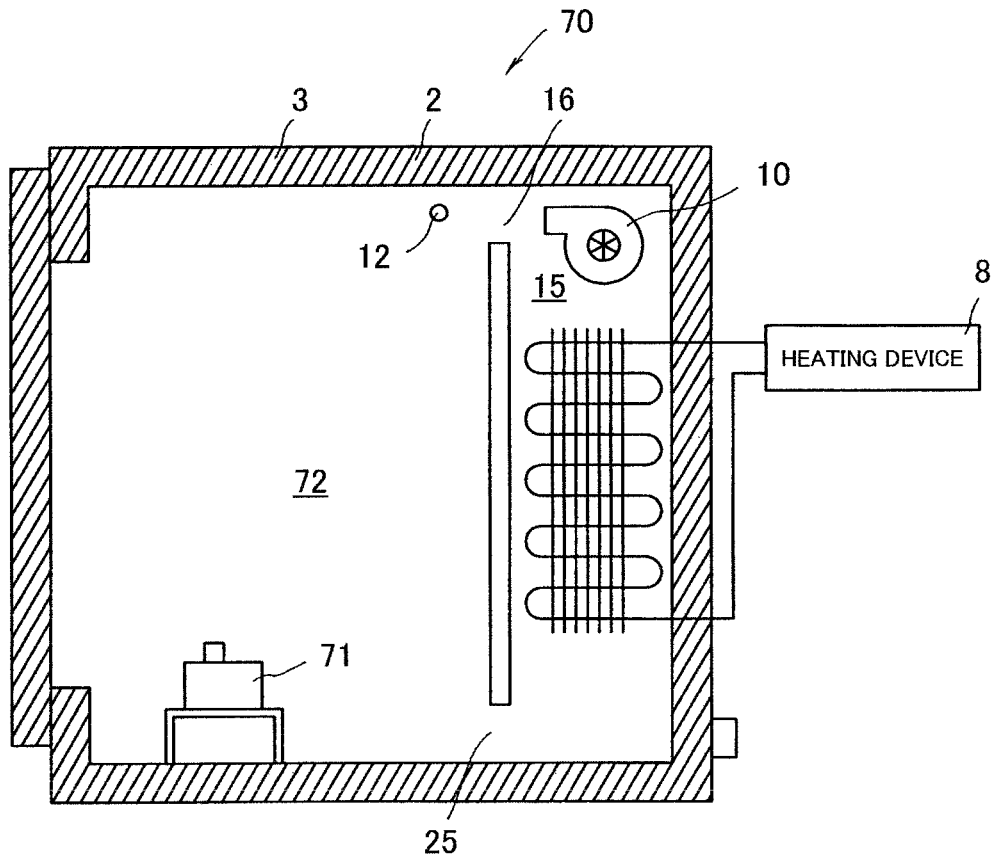
FIG. 14A is a cross-sectional view conceptually showing a mechanical structure of a heat treatment apparatus according to this embodiment.
Figure 14B:
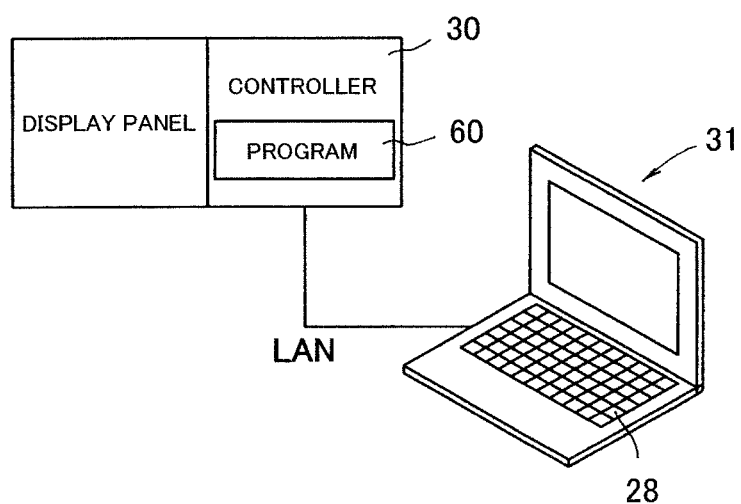
FIG. 14B is a conceptual view of the controller and input device of the apparatus.

The present invention can also be applied to a heat treatment apparatus 70 as shown in FIGS. 14A and 14B. The heat treatment apparatus 70 has a structure similar to that of the environmental test apparatus 1 described above, and members having the same functions as those described above are denoted by the same reference numerals.

The heat treatment apparatus 70 is an oven that performs testing at a high temperature, heating of a treatment object 71, and drying of the treatment object 71 etc.

The heat treatment apparatus 70 has a heat treatment chamber 72 in which the treatment object 71 is placed. The heat treatment apparatus 70 has the heating device 8 as the air conditioner 17, but has no cooling device.

The temperature control performed by the heat treatment apparatus 70, the configuration, and the function of the controller 30 are the same as those of the environmental test apparatus 1 described above. The heat treatment apparatus 70 allows selection, as a method of setting the target locus of temperature change, between a setting method based on the change amount/time setting method and a setting method based on the change amount/change rate setting method. Further, similar to the environmental test apparatus 1 described above, the heat treatment apparatus 70 can perform exposure time control.

The environmental test apparatus 1 according to the above embodiment is configured not to set "exposure time control" to "ON" when gradient control is set to "ON" or "ON (change rate)". However, the present invention is not limited to this configuration, and may be configured to perform both gradient control and exposure time control. The same applies to the heat treatment apparatus 70.

EXPLANATION OF REFERENCE SIGNS

- 1: environmental test apparatus
- 5: test chamber
- 17: air conditioner (environment adjusting device)
- 28: keyboard
- 30: controller (environment forming apparatus controller)
- 31: input device
- 32: input screen
- 33: step display section
- 35: setting item display section
- 36: temperature setting section
- 37: temperature gradient selection section
- 38: change rate input section
- 43: time setting section
- 44: initial screen
- 60: computer program
- 70: heat treatment apparatus

The invention claimed is:

1. An environmental test apparatus capable of placing a test object in a desired test environment to perform an environmental test,
wherein the environmental test apparatus is capable of changing the test environment during execution of the environmental test,
wherein the environmental test apparatus is capable of inputting change rate information associated with a change amount of environmental factor per unit time,
wherein the environmental test apparatus is capable of setting a target locus of change using the change rate information as one item of input information,
wherein the environmental test apparatus is capable of inputting time information associated with a time required for an environmental change, and
wherein the environmental test apparatus inhibits input of the time information when the target locus of change is set by the change rate information as one item of input information.

2. The environmental test apparatus according to claim 1, wherein the environmental test apparatus inhibits input of the change rate information when the target locus of change is set by the time information as one item of input information.

3. The environmental test apparatus according to claim 1, wherein the environmental factor to be changed is temperature.

4. The environmental test apparatus according to claim 1, wherein a time required for a change is computed and displayed when the target locus of change is set using the change rate information as one item of input information.

5. An environmental test apparatus,
wherein the environmental test apparatus is capable of inputting change amount information associated with a total change amount, time information associated with a time required for an environmental change, and change rate information associated with a change amount of environmental factor per unit time,
wherein the environmental test apparatus is capable of setting a target locus of change using a change amount/time setting method of setting the target locus of change based on a combination of the change amount information and the time information or using a change amount/change rate setting method of setting the target locus of change based on a combination of the change amount information and the change rate information, and
wherein the environmental test apparatus inhibits input of the time information when the target locus of change is set by the change amount/change rate setting method.

6. The environmental test apparatus according to claim 5, wherein the environmental factor to be changed is temperature.

7. The environmental test apparatus according to claim 5, wherein a time required for a change is computed and displayed when the target locus of change is set using the change rate information as one item of input information.

8. The environmental test apparatus according to claim 5, wherein a change rate of environmental factor is computed and displayed when the target locus of change is set using the time required for an environmental change as one item of input information.

9. An environmental test apparatus capable of placing a test object in a desired test environment to perform an environmental test,
wherein the environmental test apparatus is capable of changing the test environment during execution of the environmental test,
wherein the environmental test apparatus is capable of inputting change rate information associated with a change amount of environmental factor per unit time,
wherein the environmental test apparatus is capable of setting a target locus of change using the change rate information as one item of input information,
wherein the environmental test apparatus is capable of inputting time information associated with a time required for an environmental change, wherein the environmental test apparatus is capable of setting the target locus of change using the time information as one item of input information, and wherein the environmental test apparatus inhibits input of the change rate information when the target locus of change is set by the time information as one item of input information.

10. An environmental test apparatus capable of, placing a test object in a desired test environment to perform an environmental test, wherein the environmental test apparatus is capable of changing the test environment during execution of the environmental test, wherein the environmental test apparatus is capable of inputting change rate information associated with a change amount; of environmental factor per unit time, wherein the environmental test apparatus is capable of setting the target locus of change using the change rate information as one item of input information, wherein the environmental test apparatus is capable of setting the target locus of change using a time required for an environmental change as one item of input information, and wherein a change rate of environmental factor is computed and displayed when the target locus of change is set using the time required for an environmental change as one item of input information.

11. An environment forming apparatus controller that operates, an environment forming apparatus including an environment adjusting device, wherein the controller is capable of inputting change rate information associated with a change amount of environmental factor per unit time, wherein the controller sets a target locus of charge based on the change rate information, wherein the controller controls the environment adjusting device in accordance with the target locus, wherein the controller is capable of inputting time information associated with a time required for an environmental change, wherein the controller is capable of setting the target locus of change using the time information as one item of input information, and wherein the controller inhibits input of the change rate information when the target locus of change is set by the time information as one item of input information.

12. An environment forming apparatus controller that operates an environment forming apparatus including an environment adjusting device, wherein the controller is capable of inputting change rate information associated with a change amount of environmental factor per unit time, wherein the controller sets a target locus of change based on the change rate information, wherein the controller controls the environment adjusting device in accordance with the target locus, wherein the controller is capable of inputting time information associated with, a time required for an environmental change, and wherein the controller inhibits input of the time information when the target locus of change is set by the change rate information as one item of input information.

13. A non-transitory recording medium comprising therein a computer program that operates a controller of an environment forming apparatus including an environment adjusting device, wherein the program is capable of inputting change rate information associated with a change amount of environmental factor per unit time, wherein the program sets a target locus of change based on the change rate information, wherein the program controls the environment adjusting device in accordance with the target locus, wherein the computer program is capable of inputting time information associated with a time required for an environmental change, and wherein the computer program inhibits input of the time information when the target locus of change is set by the change rate information as one item of input information.

14. A non-transitory recording medium comprising therein a computer program that operates a controller of an environment forming apparatus including an environment adjusting device, wherein the program is capable of inputting change rate information associated with a change amount of environmental factor per unit time, wherein the program sets a target locus of change based on the change rate information, wherein the program controls the environment adjusting device in accordance with the target locus, wherein the computer program is capable of inputting time information associated with a time required for an environmental change, wherein the computer program is capable of setting the target locus of change using the time information as one item of input information, and wherein the computer program inhibits input of the change rate information when the target locus of change is set by the time information as one item of input information.

15. A heat treatment apparatus comprising:

a heat treatment chamber configured to place a treatment object therein; and a heating device raising a temperature in the heat treatment chamber to perform heat treatment to the object therein, wherein the heat treatment apparatus is capable of changing the temperature in the heat treatment chamber during execution of heat treatment, wherein the heat treatment apparatus is capable of inputting change rate information associated with a change amount of temperature per unit time, wherein the heat treatment apparatus is capable of setting a target locus of temperature change in the heat treatment chamber using the change rate information as one item of input information, wherein the heat treatment apparatus is capable of inputting time information associated with a time required for an environmental change, and wherein the heat treatment apparatus inhibits input of the time information when the target locus of change is set by the change rate information as one item of input information.

16. A heat treatment apparatus comprising:

a heat treatment chamber configured to place a treatment object therein, and a heating device raising a temperature in the heat treatment chamber to perform heat treatment to the object therein, wherein the heat treatment apparatus is capable of changing the temperature in the heat treatment chamber during execution of heat treatment, wherein the heat treatment apparatus is capable of inputting change rate information associated with a change amount of temperature per unit time, wherein the heat treatment apparatus is capable of setting a target locus of temperature change in the heat treatment chamber using the change rate information as one item of input information, wherein the heat treatment apparatus is capable of inputting time information associated with a time required for an environmental change, wherein the heat treatment apparatus is capable of setting the target locus of change using the time information as one item of input information, and wherein the heat treatment apparatus inhibits input of the change rate information when the target locus of change is set by the time information as one item of input information.

\* \* \* \* \*